(12) United States Patent
Ballow et al.

(10) Patent No.: US 7,899,725 B2
(45) Date of Patent: Mar. 1, 2011

(54) ENHANCED BUSINESS REPORTING METHODOLOGY

(75) Inventors: John J. Ballow, Eatons Neck, NY (US);
Brian F. McCarthy, Atlanta, GA (US);
Roland Burgman, New York, NY (US)

(73) Assignee: Accenture Global Services Limited (IE)

( * ) Notice: Subject to any disclaimer, the term of this patent is extended or adjusted under 35 U.S.C. 154(b) by 1212 days.

(21) Appl. No.: 11/072,565

(22) Filed: Mar. 2, 2005

(65) Prior Publication Data

US 2005/0209943 A1 Sep. 22, 2005

Related U.S. Application Data

(60) Provisional application No. 60/549,619, filed on Mar. 2, 2004.

(51) Int. Cl.
*G06Q 40/00* (2006.01)
(52) U.S. Cl. ........................................................ 705/35
(58) Field of Classification Search .................. 705/35, 705/36 R, 37, 36 T
See application file for complete search history.

(56) References Cited

U.S. PATENT DOCUMENTS

| | | | |
|---|---|---|---|
| 6,154,731 | A | 11/2000 | Monks et al. |
| 2002/0013720 | A1 | 1/2002 | Ozono et al. ...................... 705/7 |
| 2003/0036988 | A1* | 2/2003 | James ............................. 705/35 |
| 2003/0105695 | A1 | 6/2003 | Ikeda et al. |
| 2003/0236725 | A1* | 12/2003 | Hickox et al. .................. 705/35 |
| 2004/0039676 | A1* | 2/2004 | Trainer ............................ 705/36 |
| 2004/0064331 | A1 | 4/2004 | Mayer et al. |
| 2004/0073441 | A1 | 4/2004 | Heyns et al. |
| 2004/0073477 | A1 | 4/2004 | Heyns et al. |
| 2004/0215495 | A1 | 10/2004 | Eder |
| 2004/0249731 | A1 | 12/2004 | Sonnek et al. |
| 2005/0004832 | A1 | 1/2005 | Ostergard et al. |
| 2005/0004857 | A1* | 1/2005 | Schwarz et al. ............... 705/36 |
| 2005/0038721 | A1* | 2/2005 | Goeckel et al. ................ 705/30 |
| 2005/0144096 | A1 | 6/2005 | Caramanna, II et al. |
| 2005/0209942 | A1 | 9/2005 | Ballow et al. |
| 2005/0209943 | A1 | 9/2005 | Ballow et al. |
| 2005/0209944 | A1 | 9/2005 | Ballow et al. |
| 2005/0209945 | A1 | 9/2005 | Ballow et al. |

(Continued)

OTHER PUBLICATIONS

United States Patent and Trademark Notice of Allowability dated Mar. 5, 2008 for copending U.S. Appl. No. 11/072,895.

(Continued)

*Primary Examiner* — Thu-Thao Havan
*Assistant Examiner* — Greg Pollock
(74) *Attorney, Agent, or Firm* — Brinks Hofer Gilson & Lione

(57) ABSTRACT

Software encoded on a computer-readable medium when executed performs a method for assessing the performance of a company. The method includes receiving financial data about the company; calculating a Total Economic Profit (TEP) value based in part on the financial data, the TEP value including a current value component and a future value component, determining at least one business component of the company that drives at least one selected from the group comprising the current value component and the future value component, and assessing the at least one business component based in part on at least one selected from the group comprising the TEP value, the current value component, and the future value component. From this data, a Total Return to Shareholders (TRS) value may be calculated with a data processor. The TRS may be decomposed into components and mapped onto a computer-generated display. The data may also be incorporated in corporate management systems and investment analysis systems, and used to generate a set of supplemental financial reports.

15 Claims, 15 Drawing Sheets

U.S. PATENT DOCUMENTS

2005/0209946 A1  9/2005  Ballow et al.

OTHER PUBLICATIONS

Non-final Office Action from copending U.S. Appl. No. 11/072,895 dated Jul. 5, 2007.

Alexa Michl et al., The CFO Project, Competitive Financial Operations, "*Watching Goodwill Go Bad*"; 14 pages, Oct. 1, 2003;info@mriresearch.com.

Wlodek Zadronzy, IBM Research Report, "*Text Analytics for Asset Valuation*", IBM Research Division, Thomas J. Watson Research Center, Aug. 27, 2004, Computer Science.

John J. Ballow et al., Blackwell Synergy, "*Future Value: The $7 Trillion Challenge*" Journal of Applied Corporate Finance, vol. 16, Issue 1, p. 71, Winter 2004.

John Ballow, et al., A New Paradigm for Managing Shareholder Value, Accenture Institute for High Performance Business, Jul. 2004; 24 pages.

John J. Ballow, et al., Accenture Institute for High Performance Business, "*New Concepts in Value-Based Management*", TRS Mapping and Total Economic Profit, Research Note, Intangible Assets and Future Value, Issue Two, May 10, 2004.

John J. Ballow et al., "*Enhanced Business Reporting*", A formal joint proposal to the AICPA from Accenture LLP & AssetEconomics, Inc., Oct. 2004.

John J. Ballow et al., "*Managing for shareholder value: intangibles, future value and investment decisions*", Journal of Business Strategy, vol. 25, No. 3, 2004, printed from website www.ingentaconnec.com/content/mcb, 2 pages, Jan. 29, 2007.

Esa Mäkeläinen, Universitas Oeconomica Helsingiensis, "*Econmic Value Added as a management tool*", Sep. 9, 1998, 49 pages; http://www.evanomics.com/evastudy.shtml.

Brian F. McCarthy, "*Instant gratification or long-term value? A lesson in enhancing shareholder wealth*", Journal of Business Strategy, vol. 25, No. 4, 2004, printed from website http://ingentaconnect.com/content/mcb, 2 pages, Jan. 29, 2007.

\* cited by examiner

Total Return to Shareholders Statement

Assumptions

| Target Input Variables | |
|---|---|
| NOPLAT Growth | 10.00% Targeted growth rate determined by planning process |
| Terminal Growth (GDP) | 3.50% GDP terminal growth based on historical analysis-US Dept of Commerce |
| WACC | 9.06% WACC represents the minimum return that must be generated |
| TRS | 10.00% Targeted return to shareholders; minimum % = WACC |
| Dividends Per Share | $ 0.80 Dividend payout reduces invested capital = capital returned to shareholders |

| | Historical Performance | | | Target Setting Analysis | | | |
|---|---|---|---|---|---|---|---|
| Current Value | 2001 | 2002 | 2003 | Target | Variance | Adj Target | Variance |
| Revenue | 10,744 | 11,596 | 13,181 | | 13,181 | 13,181 | 13,181 |
| - COGS (w/o Dep & Amort) | (7,924) | (8,388) | (9,186) | | (9,186) | (9,186) | (9,186) |
| + Operating Lease Expense | 333 | 443 | 499 | | 499 | 499 | 499 |
| - SG&A | (2,045) | (2,259) | (2,816) | | (2,816) | (2,816) | (2,816) |
| - Other Operating Expenses | - | - | - | | - | - | - |
| - Depreciation & Amortization Expense | (249) | (267) | (283) | | (283) | (283) | (283) |
| Adjusted EBIT | 859 | 1,126 | 1,395 | | 1,395 | 1,395 | 1,395 |
| + Amortization Expense | - | 2 | 8 | | 8 | 8 | 8 |
| EBITA | 859 | 1,128 | 1,403 | | 1,403 | 1,403 | 1,403 |
| Marginal Taxes on EBITA | (318) | (417) | (519) | | (519) | (519) | (519) |
| NOPLAT | 541 | 711 | 884 | 782 | 102 | 884 | 884 |
| + Operating Cash | 215 | 232 | 264 | | 264 | 264 | 264 |
| + Accounts Receivables | 339 | 364 | 410 | | 410 | 410 | 410 |
| + Inventory | 1,460 | 1,555 | 1,466 | | 1,466 | 1,466 | 1,466 |
| + Other Current Assets | 210 | 202 | 211 | | 211 | 211 | 211 |
| Operating Current Assets | 2,223 | 2,353 | 2,351 | | 2,351 | 2,351 | 2,351 |
| - Accounts Payable | (935) | (1,092) | (1,111) | | (1,111) | (1,111) | (1,111) |
| - Income Taxes Payable | (212) | (190) | (207) | | (207) | (207) | (207) |
| - Other Current Liabilities | (443) | (566) | (615) | | (615) | (615) | (615) |
| Non-Interest bearing Current Liabilities | (1,591) | (1,848) | (1,933) | | (1,933) | (1,933) | (1,933) |
| + Operating Working Capital | 632 | 506 | 418 | | 418 | 418 | 418 |
| + Net PPE | 1,359 | 1,448 | 1,505 | | 1,505 | 1,505 | 1,505 |
| + Implied Value of Operating Leases | 6,559 | 8,229 | 8,426 | | 8,426 | 8,426 | 8,426 |
| + Other Operating Assets | 106 | 348 | 317 | | 317 | 317 | 317 |
| - Other Operating Liabilities | (86) | (105) | (142) | | (142) | (142) | (142) |
| Invested Capital w/o Goodwill | 8,570 | 10,426 | 10,524 | | 10,524 | 10,524 | 10,524 |
| + Net Goodwill | 780 | 1,757 | 1,752 | | 1,752 | 1,752 | 1,752 |
| Invested Capital w/ Goodwill | 9,350 | 12,184 | 12,276 | 12,587 | (311) | 12,276 | 12,276 |
| Current Value | 5,239 | 7,846 | 9,974 | 8,631 | (1,343) | 9,974 | 9,974 |
| Operating Advantage | | | - | | - | - | - |
| Financing | | | | | | | |
| Risk Free Rate | 5.03% | 3.96% | 4.33% | 3.96% | 0.37% | 4.33% | 4.33% |
| Market Risk Premium | 5.00% | 5.00% | 5.00% | 5.00% | - | 5.00% | 5.00% |
| Beta | 2 | 2 | 2 | 2 | (1) | 2 | 1.61 |
| Ke (Cost of Equity) | 15.33% | 15.36% | 12.38% | 15.35% | -2.98% | 12.38% | 12.38% |
| Kd | 6.69% | 5.62% | 5.99% | 5.62% | 0.37% | 5.99% | 5.99% |
| Tax Rate | 37.0% | 37.0% | 37.0% | 37.0% | - | 37.00% | 37.00% |
| Market Capitalization | 8,454 | 8,123 | 13,284 | 8,557 | 4,726 | 13,284 | 13,284 |
| Total Debt | 6,914 | 9,289 | 9,184 | 10,218 | (1,034) | 9,184 | 9,184 |
| Total Market Value | 15,368 | 17,412 | 22,467 | 18,775 | 3,692 | 22,467 | 22,467 |
| WACC (Weighted Average Cost of Capital) | 10.33% | 9.06% | 8.86% | 9.06% | -0.19% | 8.86% | 8.86% |
| Δ in CV due to Tax Rate Δ | | | - | | - | - | - |
| Δ in CV due to Capital Structure Δ (WACC) | | 969 | 212 | | 212 | 212 | 212 |
| Δ in CV due to Operations | | 1,639 | 1,916 | 785 | 1,131 | 1,916 | 1,916 |
| Change in Current Value Check | | - | - | (0) | 0 | - | - |

|  | Historical Performance | | Target Setting Analysis | |
|---|---|---|---|---|
| Enterprise Value | | | | |
| Enterprise Value | 15,368 | 17,412 | 22,467 | 18,775 | (3,692) | 22,467 |
| Market Value Added | 6,018 | 5,229 | 10,192 | 6,188 | 4,003 | 10,192 |
| Capital Charge | 966 | 1,103 | 1,088 | 1,140 | (52) | 1,088 |
| Economic Profit ($) | (425) | (393) | (204) | (358) | 154 | (204) |
| Return on Invested Capital (%) | 5.79% | 5.83% | 7.20% | 6.21% | 0.99% | 7.20% |
| Future Value | | | | | | |
| Future Value (Economic View displayed) | 10,129 | 9,566 | 12,493 | 10,144 | (2,349) | 12,493 |
| Operating Disadvantage | 6,218 | 7,069 | 3,803 | 6,448 | 2,645 | 3,803 |
| Expected Growth at GDP (as illustrative idex) | 2,684 | 4,942 | 6,508 | 5,436 | (1,072) | 6,508 |
| Future Value Premium (FV') | 1,228 | (2,446) | 2,182 | (1,740) | (3,922) | 2,182 |
| Market Benchmark Index Value (S&P 500) | 1,130 | 856 | 1,131 | 886 | 245 | 1,131 |
| Market Benchmark % Return (S&P 500) | | -24.29% | 32.19% | 3.50% | 28.69% | 32.19% |
| Future Value Indexed (FV') | | 11,358 | 12,295 | 10,402 | 1,892 | 12,295 |
| Adjusted Future Value of EP (FV' * WACC) | | 1,029 | 1,090 | 942 | 148 | 1,090 |
| EP + (EP + Adjusted Future Value of RONA) | | 636 | 886 | 584 | 302 | 886 |
| Total Economic Profit | | | | | | |
| Economic Profit | (425) | (393) | (204) | (358) | 154 | (204) |
| Invested Capital Charge | 966 | 1,103 | 1,088 | 1,140 | (52) | 1,088 |
| Economic Profit of Future Value (EPFV) | 1,047 | 866 | 1,107 | 919 | 189 | 1,107 |
| EP Finance (Dividends,WACC,D/E) | 38 | | | 34 | (34) | - |
| Total Economic Profit $ | 1,626 | 1,577 | 1,991 | 1,735 | 257 | 1,991 |
| Total Economic Profit % | | -3.03% | 26.29% | 10.00% | 16.29% | 26.29% |
| Total Return to Shareholders | | | | | | |
| Common Shares Outstanding | 464 | 473 | 499 | 473 | 26 | 499 |
| Share Price | 18.22 | 17.17 | 26.61 | 18 | 9 | 27 |
| Dividends Paid per share | 1 | (331) | - | 0.80 | (1) | - |
| TRS ($) attributable to Share Price | | | 5,160 | 8,557 | (3,397) | |
| TRS ($) attributable to Dividends | | | | 378 | (378) | |
| TRS ($) | 8,825 | 8,123 | 13,284 | 8,936 | 4,348 | 13,284 |
| TRS ($) Indexed | | 9,450 | 17,446 | 9,516 | 7,930 | 17,446 |
| TRS (%) Return attributable to Share Price Δ | | -5.76% | 54.98% | 5.34% | 49.64% | 54.98% |
| TRS (%) Return attributable to Dividends | | | - | 4.66% | 4.66% | - |
| TRS (%) | | -5.76% | 54.98% | 10.00% | 44.98% | 54.98% |
| TRS (%) Indexed | | 18.52% | 22.79% | 6.50% | 16.29% | 22.79% |

| 2003 | 2004 | 2005 | 2006 | 2007 | |
|---|---|---|---|---|---|
| TRS% | | | | | |
| 1.00 | 1.10 | 1.21 | 1.33 | 1.46 | ◄—610 |
| TRS $ (EQUITY + DIVIDENDS) | | | | | |
| $3,200 | $3,520 | $3,872 | $4,259 | $4,685 | ◄—612 |
| DIVIDENDS | | | | | |
| $200 | $210 | $221 | $232 | $243 | ◄—614 |
| EQUITY (MV) | | | | | |
| $3,000 | $3,310 | $3,652 | $4,028 | $4,442 | ◄—616 |
| DEBT | | | | | |
| $2,000 | $2,207 | $2,434 | $2,685 | $2,961 | ◄—618 |
| ENTERPRISE VALUE (EV) | | | | | |
| $5,000 | $5,517 | $6,086 | $6,713 | $7,403 | ◄—620 |
| ECONOMIC PROFIT OF CURRENT VALUE (EP OF CV) | | | | | |
| $750 | $825 | $908 | $998 | $1,098 | ◄—622 |
| FUTURE VALUE (FV) | | | | | |
| $4,250 | $4,692 | $5,175 | $5,715 | $6,305 | ◄—624 |
| ECONOMIC PROFIT | | | | | |
| $75 | $83 | $91 | $100 | $110 | ◄—626 |
| ECONOMIC PROFIT OF FUTURE VALUE (EP OF FV) | | | | | |
| $425 | $469 | $518 | $571 | $631 | ◄—628 |
| TOTAL ECONOMIC PROFIT | | | | | |
| $500 | $552 | $609 | $671 | $740 | ◄—630 |
| ANNUAL TRS $ CHANGE | | | | | |
| | $520 | $562 | $608 | $657 | ◄—632 |

GROWTH 10% —602

DIVIDEND % 5% —604

DEBT/EQUITY % 40% —606

Annual TRS $ Change = (TEP2 - TEP1)/WACC - Change in Debt + Dividends
Where TEP2 represents Total Economic Profit at end of period and TEP1 represents Total Economic Profit at beginning of period and assume WACC is constant over time

Fig. 6

Statement of Total Economic Profit

XYZ Corporation
Statement of Total Economic Profit
$ Millions

| | Prior Year | Change | Change % | Current Year | Change | Change % |
|---|---|---|---|---|---|---|
| Earnings before interest and taxes (EBIT) | $ 1,358.9 | $ (2.8) | -0.2% | $ 1,697.9 | $ 338.0 | 24.9% |
| Less: Cash Taxes | (530.0) | 6.3 | -1.2% | (656.7) | (126.7) | 23.9% |
| Net Operating Profit After Tax (NOPAT) | 829.0 | 3.6 | 0.4% | 1,041.2 | 212.3 | 25.6% |
| Invested Capital | 7,721.5 | (326.4) | -4.1% | 9,857.9 | 2,136.4 | 27.7% |
| Weighted Average Cost of Capital (WACC) | 9.5% | -0.1% | | 9.0% | -0.5% | |
| Capital Charge | 733.5 | (39.1) | -5.1% | 887.2 | 153.7 | 20.9% |
| Economic Profit of Current Value (EPCV) | 95.4 | 42.6 | 80.8% | 154.0 | 58.6 | 61.4% |
| Economic Profit of Future Value (EPFV) | 675.4 | (554.8) | -45.1% | 1,282.0 | 606.7 | 89.8% |
| Total Economic Profit (TEP) | $ 770.8 | $ (512.1) | -39.9% | $ 1,436.0 | $ 665.2 | 86.3% |
| Additional Disclosure | | | | | | |
| Return on Invested Capital (ROIC) | 10.7% | 0.4% | | 10.6% | -0.1% | |
| Weighted Average Cost of Capital (WACC) | 9.5% | -0.1% | | 9.0% | -0.5% | |
| Spread (ROIC - WACC) | 1.2% | 0.5% | | 1.6% | 0.4% | |
| Invested Capital | $ 7,721.5 | (326.42) | -4.1% | $ 9,857.9 | 2,136.4 | 27.7% |
| Economic Profit of Current Value (EPCV) | $ 95.4 | 42.6 | 80.8% | $ 154 | 58.6 | 61.4% |

Fig. 8

Statement of Enterprise Value

XYZ Corporation
Statement of Enterprise Value
$ Millions

| | Prior Year | Change | Change % | Current Year | Change | Change % |
|---|---|---|---|---|---|---|
| Closing Share Price of Equity | $ 29.07 | $ (15.86) | -35.3% | $ 53.25 | $ 24.18 | 83.2% |
| Number of Shares Outstanding (in Thousands) | 322.0 | 2.74 | 0.9% | 324.7 | 2.68 | 0.8% |
| Market Value of Equity | $ 9,359.7 | $ (4,983.3) | -34.7% | $ 17,287.6 | $ 7,927.9 | 84.7% |
| Market Value of Debt | 6,486.5 | (503.4) | -7.2% | 8,544.9 | 2,058.4 | 31.7% |
| Enterprise Value | $ 15,846.2 | $ (5,486.7) | -25.7% | $ 25,832.5 | $ 9,986.3 | 63.0% |
| Additional Disclosure | | | | | | |
| Economic Profit of Current Value (EPCV) | $ 95.4 | 42.6 | 80.8% | $ 154.0 | 58.6 | 61.4% |
| Weighted Average Cost of Capital (WACC) | 9.5% | -0.1% | 0.0% | 9.0% | -0.5% | 0.0% |
| Value of EPCV in perpetuity | 1,004.3 | 454.6 | 82.7% | 1,711.0 | 706.7 | 70.4% |
| Plus: Invested Capital | 7,721.5 | (326.4) | -4.1% | 9,857.9 | 2,136.4 | 27.7% |
| Current Value | 8,725.8 | 128.2 | 1.5% | 11,568.9 | 2,843.1 | 32.6% |
| Enterprise Value | 15,846.2 | (5,486.7) | -25.7% | 25,832.5 | 9,986.3 | 63.0% |
| Less: Current Value | 8,725.8 | 128.2 | 1.5% | 11,568.9 | 2,843.1 | 32.6% |
| Future Value | 7,120.4 | (5,614.9) | -44.1% | 14,263.6 | 7,143.2 | 100.3% |
| Debt to Equity Ratio | 0.69 | 0.20 | 40.8% | 0.49 | (0.20) | -29.0% |

Fig. 9

Statement of Total Return to Shareholders - Unadjusted

XYZ Corporation
Statement of Total Return to Shareholders (Unadjusted)
$ Millions

| | Prior Year | Change | Change % | Current Year | Change | Change % |
|---|---|---|---|---|---|---|
| Value of EPCV in perpituity | $ 1,004.3 | $ 454.6 | 83% | $ 1,711.0 | $ 706.7 | 70.4% |
| Invested Capital | 7,721.5 | (326.4) | -4.1% | 9,857.9 | 2,136.4 | 27.7% |
| Less: Capital Subordinated to Debt | $ 6,487 | $ (502) | -7.7% | $ 8,545 | $ 2,058 | 31.7% |
| Capital Available to Equity Holders | $ 1,235 | 176.05 | 16.6% | $ 1,313 | 78.02 | 6.3% |
| Current Value in the Market Value of Equity | $ 2,239 | 630.66 | 39.2% | $ 3,024 | 785 | 35.0% |
| Future Value in the Market Value of Equity | $ 7,120 | (5,613.99) | -44.1% | $ 14,264 | 7,143 | 100.3% |
| Market Value of Equity | $ 9,360 | (4,983) | -34.7% | $ 17,288 | 7,928 | 84.7% |
| Number of Equity Shares Outstanding (in Thousands) | 321.97 | | | 324.65 | | |
| Close Share Price of Equity Shares | $ 29.07 | $ (15.86) | -35.3% | $ 53.25 | 24.18 | 83.2% |
| Dividends Received in Period | $ — | $ — | | | 0.40 | |
| Total Return to Shareholders (Unadjusted) | | $ (15.86) | -35.3% | | $ 24.58 | 84.6% |

Fig. 10

Statement of Total Return to Shareholders - Adjusted

XYZ Corporation
Statement of Total Return to Shareholders (Adjusted)
$ Millions

| | Prior Year | Change % | Current Year | Change % |
|---|---|---|---|---|
| Adjusted Closing S&P 500 Index | 841.95 | -31.4% | 1,144.94 | 36.0% |
| Beta | 0.8 | | 0.7 | |
| Predicted company return due to market movement | | -25.2% | | 25.2% |
| Total Return to Shareholders (TRS) | | -35.3% | | 84.6% |
| Better/(Worse) than predicted on market movement | | -10.1% | | 59.4% |

Fig. 11

ENHANCED BUSINESS REPORTING METHODOLOGY

RELATED APPLICATIONS

The present patent document claims the benefit of the filing date under 35 U.S.C. §119(e) of Provisional U.S. Patent Application Ser. No. 60/549,619, filed Mar. 2, 2004, which is hereby incorporated by reference. This application is related to U.S. application Ser. No. 11/072,351 filed Mar. 2, 2005, U.S. application Ser. No. 11/072,354 filed Mar. 2, 2005, U.S. application Ser. No. 11/072,566 filed Mar. 2, 2005, U.S. application Ser. No. 11/072,567 filed Mar. 2, 2005, and U.S. application Ser. No. 11/072,895 filed Mar. 2, 2005.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to any software and data as described below and in the drawings hereto: Copyright© 2005, Accenture, All Rights Reserved.

BACKGROUND

1. Technical Field

The present invention relates generally to business performance management, and more particularly to a system and method for evaluating a company's performance based on the decomposition and mapping of total return to shareholders, and preparing financial statements indicative of the company's performance.

2. Background Information

Business performance management (BPM), also known as Enterprise performance management (EPM), relates to the execution and monitoring of the performance of various components of a company's business. BPM, sometimes referred to as the next generation of business intelligence (BI), focuses on business processes such as planning and forecasting and helps businesses discover efficient use of their business units, financial, human, and material resources. Typically, BPM systems consolidate data from various sources, and provide functions for querying and analyzing the data and putting the results into practice.

BPM enhances business processes by creating better feedback loops that allow for the continuous, real-time review of information to help identify and eliminate problems before they grow. For example, forecasting capabilities may help the company take corrective action in time to meet earnings projections. BPM may also be useful in risk analysis and predicting outcomes of merger and acquisition scenarios, as well as planning to overcome potential problems.

BPM provides key performance indicators (KPI), or performance metrics, that help companies monitor efficiency of projects and employees against operational targets. These metrics/KPI may be used to assess the present state of the business and to prescribe a course of action. For example, BPM systems have been used to analyze: New customers acquired; Status of existing customers; Attrition of customers; Turnover generated by segments of the Customers; Outstanding balances held by segments of customers and terms of payment; Collection of bad debts within customer relationships; Demographic analysis of individuals (potential customers) applying to become customers, and the levels of approval, rejections and pending numbers; Delinquency analysis of customers behind on payments; and Profitability of customers by demographic segments and segmentation of customers by profitability. Regardless of the type of analysis a BPM system may be used for, BPM systems must acquire metric/KPI that is consistent, correct, and timely available.

Despite the great benefits many BPM systems provide, these systems are only as powerful as the metrics/KPI used to benchmark business performance. Unfortunately, there is a disconnect in traditional BPM systems between the financial performance metrics companies use in analyzing business performance and the ability to create and sustain high performance results in their execution over time. This disconnect arises because most companies take an internal approach to evaluating their business performance using performance metrics such as Earnings per Share (EPS), Return on Net Assets (RONA), Earnings Before Interest, Taxes, Depreciation, and Amortization (EBITDA), Return on Investment Capital (ROIC), Economic Value Added (EVA), Cash Flow Return on Investment (CFROI), and the like. These metrics neglect the true drivers of sustainable shareholder value and instead only determine the operating performance for the current operating year. Essentially, these metrics only provide analysis of a company's current value, or the present value of the uniform perpetual earnings on assets currently held by the company.

This disconnect becomes even more apparent when analyzing companies such as biotech companies with a high percentage of future value, or the present value of company opportunities for investments in real assets that will yield more than the normal market rate of return. For example, traditional value management focuses on Net Operating Profit Less Adjusted Taxes (NOPLAT) as the only source of "Return" on Invested Capital. Because high future value firms have little or no NOPLAT, there is no accounting for the value created by these types of companies.

Companies attempt to solve this disconnect through the implementation of major new transactional systems or point solutions to specific problems, such as ERP systems and data warehouses. Although these solutions are good at tracking transactional data, they do not help a company plan for what may occur and track the key drivers to enable decision making. Point solutions are band-aides that don't address the real problem of proactively managing those aspects of business performance that contribute to sustainable shareholder value.

Other companies address the current problems with BPM by implementing a Balanced Scorecard or Executive Dashboard. Exemplary scorecards and dashboards include the Cognos® Metrics Manager and Cognos® Visualizer, provided by Cognos, Inc. of Ottawa, Canada, and the Hyperion Performance Scorecard, provided by Hyperion Solutions Corporation of Sunnyvale, Calif. These solutions attempt to capture the financial and non-financial drivers of value for the company. These solutions typically provide results that are useful and insightful. However, these solutions may not be integrated into the remaining BPM systems utilized by the company, and may not incorporate metrics reflective of the true drivers of shareholder values.

Accordingly, there is a need for software tools and information technology solutions to create an integrated capability to drive BPM strategy and value creation that accurately measures the key drivers of both current and future value from an external perspective as well as detail how these drivers interrelate.

From that external perspective, in addition to improving management of the key drivers for increasing shareholder value, the measures of those drivers and the resultant performance of the company's current and future value components must be communicated to the shareholders in a transparent manner. It should be appreciated by one of ordinary skill in the art that while intangible assets have taken on an increasingly pronounced role in key value drivers in the economy, standard accounting practices have remained fixated on tracking, measuring and managing tangible assets. Consequently, a large majority of the enterprise assets that create value go under-recognized and under-reported. As companies cannot manage what is not being measured, a large proportion of the assets that are responsible for creating value in today's economy are by default inadequately managed. See, e.g., Daum, Jurgen H., *Intangible Assets and Value Creation*, p. 43, John Wiley and Sons (2002).

In conventional financial reporting, value is defined more in terms of Book Value and is historical in nature. Management's Discussion and Analysis of Financial Condition and Results of Operations (MD&A) and supplementary disclosures for traditional financial reporting in those reports are generally based on historical performance and variances in statutory financial position according to the application of GAAP. Forward Looking Statements (FLS) provide the opportunity to include objectives, plans and projections for future operations, as well as statements about probable and possible future economic performance. As has been noted, the marketplace—both investors and company management teams—need a more forward-looking tracking and reporting approach.

In addition, the key question that remains stems from what exactly is being reported, particularly in the FLS, and how useful that information is in helping shareholders and other stakeholders clearly understand the direction in which the company is headed, what their final destination is and how long will it take them to get there. It is noted that the Securities and Exchange Commission (SEC) has made concerted efforts in recent years to elicit MD&A that is informative and transparent. Indeed, the purpose of the MD&A is not complicated. It is to provide reader with information that is "necessary to an understanding of a company's financial condition, changes in financial condition and results of operations". MD&A requirements are intended to satisfy three principal objectives: (1) to provide a narrative explanation of a company's financial statements through the eyes of management; (2) to enhance the overall financial disclosure and provide the context within which financial information should be analyzed; and (3) to provide information about the quality of, and potential variability of, a company's earnings and cash flow, so that investors can ascertain the likelihood that past performance is indicative of future performance.

Accordingly, there is a need for software tools and information technology solutions to create an integrated capability to accurately measure the key drivers of both current and future value from an external perspective as well as detail how these drivers interrelate, and to generate enhanced financial statements that better inform management and shareholders of the company's performance.

BRIEF SUMMARY

In one embodiment, the invention includes a computer-implemented method for the EBR methodology for preparing corporate financial statements incorporating financial metrics to measure the performance of a company includes receiving financial data about the company; preparing a Statement of Total Economic Profit (TEP) comprising calculating with a data processor EBIT, NOPAT, WACC, EPCV, EPFV and TEP at least at the beginning and ending of a reporting period based on the received financial data; preparing a Statement of Enterprise Value (EV) comprising calculating with a data processor market value of equity, market value of debt, and enterprise value at least at the beginning and ending of a reporting period based on the received financial data; preparing a Statement of Total Return to Shareholders (TRS), comprising calculating with a data processor an unadjusted Total Return to Shareholders comprising a change in market value of equity plus dividends paid in the period based on the received financial data; adjusting the unadjusted TRS comprising deducting the TRS value expected from the movement of the relevant market from the beginning of the reporting period to the ending of the reporting period based on a beta value for the company based on the received financial data and reporting the adjusted TRS in a financial statement; and displaying the Statements with conventional financial reports to the financial services community.

In another embodiment, the invention includes a computer-implemented method for preparing corporate financial statements incorporating financial metrics to measure the performance of a company. This method includes receiving in a computer-readable format conventional financial reports of the company and financial data relating to performance of the company; calculating with a computer a Net Operating Profit After Tax (NOPAT); calculating with a computer a Weighted Average Cost of Capital (WACC); calculating a Return on Invested Capital (ROIC); calculating a value of Invested Capital of the company, including optional adjustments for operating leases, goodwill and stock options; calculating a Market Value of Debt, including optional adjustments for off balance sheet financing; supplementing the data from the conventional financial reports with the calculated results; and reporting electronically, financial statements including the conventional financial reports and the supplemented data, and further including market capitalization data and a valuation of a Beta for equity prices of the company's publicly traded shares.

These and other embodiments and aspects of the invention are described with reference to the noted Figures and the below detailed description of the preferred embodiments.

BRIEF DESCRIPTION OF THE DRAWINGS

FIG. 5A is a diagram representative of a computer display of a first part of an exemplary calculation worksheet;

FIG. 5B is a diagram representative of a computer display of second part of an exemplary calculation of Total Economic Profit (TEP);

FIG. 6 is a diagram representative of an TRS calculation using the TEP performance metric;

FIG. 8 illustrates a first embodiment of a financial statement generated in accordance with an enhanced business reporting methodology.

FIG. 9 illustrates a second embodiment of a financial statement generated in accordance with an enhanced business reporting methodology.

FIG. 10 illustrates a third embodiment of a financial statement generated in accordance with an enhanced business reporting methodology.

FIG. 11 illustrates a fourth embodiment of a financial statement generated in accordance with an enhanced business reporting methodology.

DETAILED DESCRIPTION OF THE DRAWINGS AND THE PRESENTLY PREFERRED EMBODIMENTS

Figure 1A:
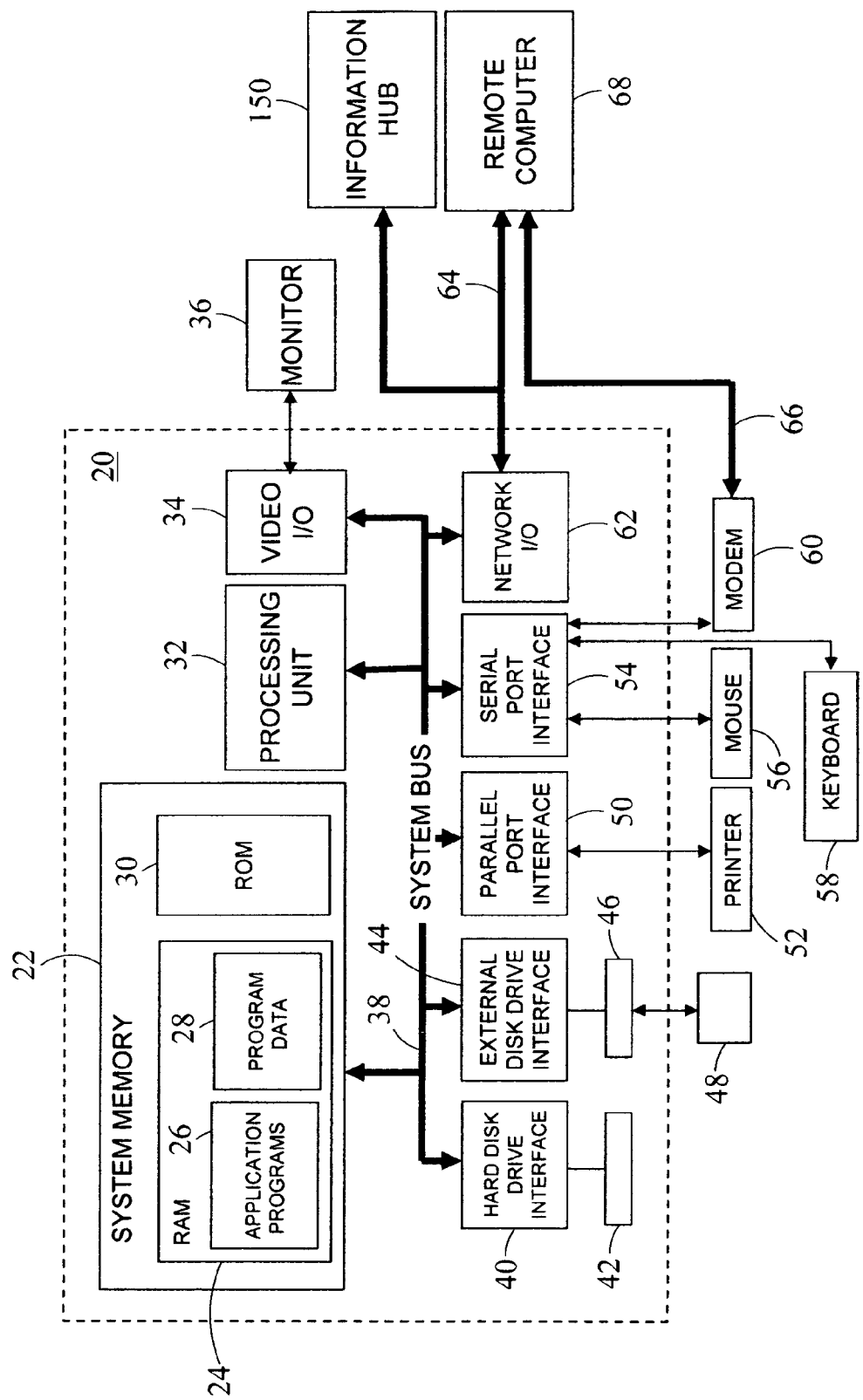
FIG. 1A is a diagram representative of an exemplary system for implementing one embodiment.

Referring now to the drawings, and initially to FIG. 1, an exemplary system for implementing the invention includes a general purpose computing device in the form of a computing environment 20, including a processing unit 32, a system memory 22, and a system bus 38, that couples various system components including the system memory 22 to the processing unit 32. The processing unit 32 may perform arithmetic, logic and/or control operations by accessing system memory 22. The system memory 22 may store information and/or instructions for use in combination with processing unit 32. The system memory 22 may include volatile and non-volatile memory, such as random access memory (RAM) 24 and read only memory (ROM) 30. A basic input/output system (BIOS) containing the basic routines that helps to transfer information between elements within the computer environment 20, such as during start-up, may be stored in ROM 30. The system bus 38 may be any of several types of bus structures including a memory bus or memory controller, a peripheral bus, and a local bus using any of a variety of bus architectures.

The computing environment 20 may further include a hard disk drive 42 for reading from and writing to a hard disk (not shown), and an external disk drive 46 for reading from or writing to a removable external disk 48. The removable disk may be a magnetic disk for a magnetic disk driver or an optical disk such as a CD ROM for an optical disk drive. The hard disk drive 42 and external disk drive 46 are connected to the system bus 38 by a hard disk drive interface 40 and an external disk drive interface 44, respectively. The drives and their associated computer-readable media provide nonvolatile storage of computer readable instructions, data structures, program modules and other data for the computing environment 20. Although the exemplary environment described herein employs a hard disk and an external disk 48, it should be appreciated by those skilled in the art that other types of computer readable media which can store data that is accessible by a computer, such as magnetic cassettes, flash memory cards, random access memories, read only memories, and the like, may also be used in the exemplary operating environment.

A number of program modules may be stored on the hard disk, external disk 48, ROM 30 or RAM 24, including an operating system (not shown), one or more application programs 26, other program modules (not shown), and program data 28. One such application program may include the functionality as detailed below.

A user may enter commands and/or information, as discussed below, into the computing environment 20 through input devices such as mouse 56 and keyboard 58. Other input devices (not shown) may include a microphone (or other sensors), joystick, game pad, scanner, or the like. These and other input devices may be connected to the processing unit 32 through a serial port interface 54 that is coupled to the system bus 38, or may be collected by other interfaces, such as a parallel port interface 50, game port or a universal serial bus (USB). Further, information may be printed using printer 52. The printer 52, and other parallel input/output devices, may be connected to the processing unit 32 through parallel port interface 50. A monitor 36, or other type of display device, is also connected to the system bus 38 via an interface, such as a video input/output 34. In addition to the monitor 36, computing environment 20 may include other peripheral output devices (not shown), such as speakers or other audible output.

The computing environment 20 may communicate with other electronic devices such as remote computer 68. Remote computer 68 may be another computing environment such as a server, router, network PC, peer device, telephone (wired or wireless), personal digital assistant, television, or the like. Remote computer 68 may include many or all of the elements described above relative to the computing environment 20. In one embodiment, the remote computer 68 is a server coupled with a database of historical financial data for a plurality of companies. Herein, the phrase "coupled with" is defined to mean directly connected to or indirectly connected with through one or more intermediate components. Such intermediate components may include both hardware and software based components. Alternatively, or in addition, the remote computer may include accounting and/or financial software for maintaining a company's internal recording keeping.

Figure 1B:
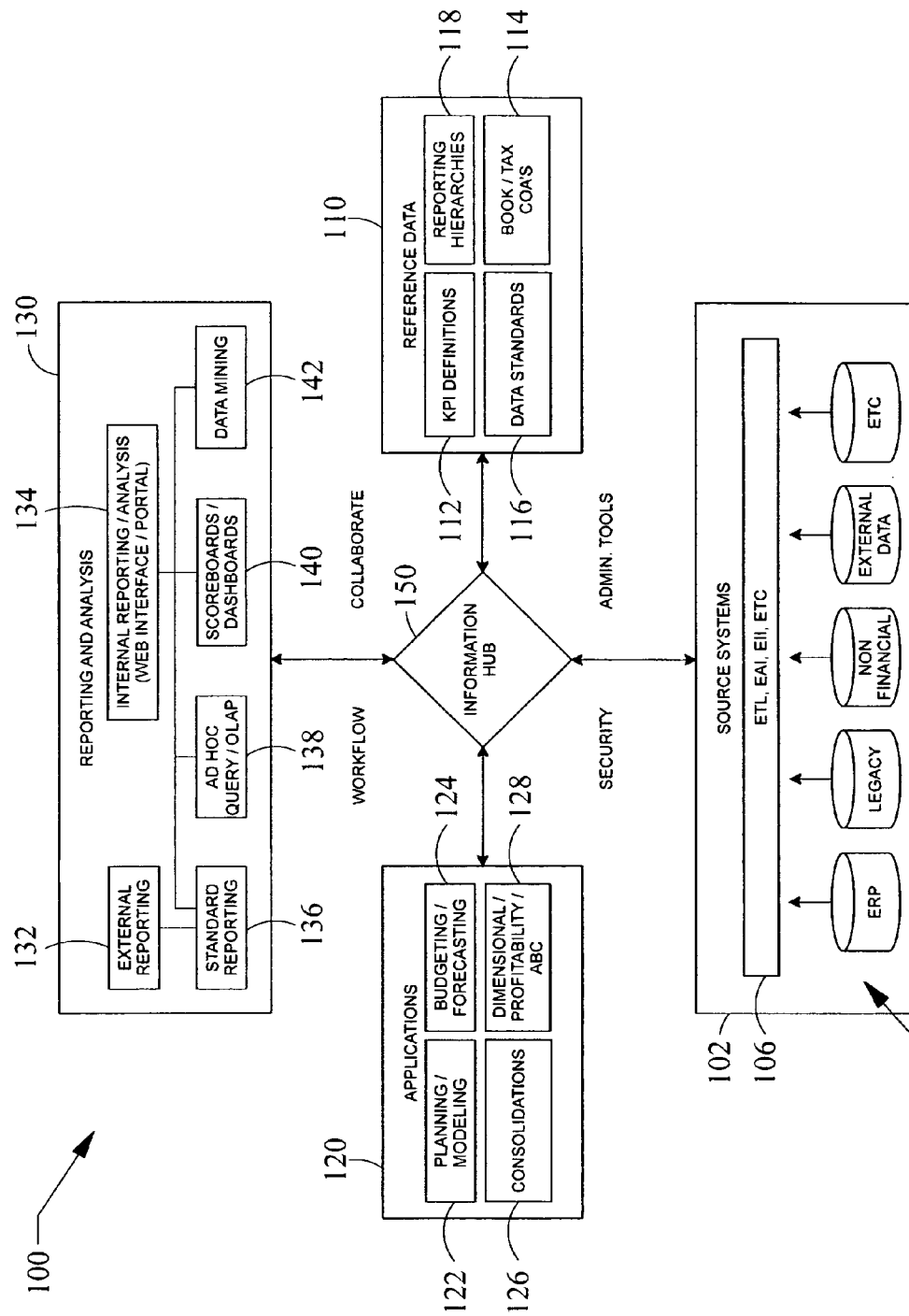
FIG. 1B is a diagram representative of an exemplary architecture for a BPM system.

To communicate, the computer environment 20 may operate in a networked environment using connections (wired, wireless or both wired and wireless) to one or more electronic devices. FIG. 1 depicts the computer environment networked with remote computer 68 and with information hub 150 of a distributed computer system for business performance management, as shown in FIG. 1B. The logical connections depicted in FIG. 1 include a local area network (LAN) 64 and a wide area network (WAN) 66. Such networking environments are commonplace in offices, enterprise-wide computer networks, intranets and the Internet.

When used in a LAN networking environment, the computing environment 20 may be connected to the LAN 64 through a network I/O 62. When used in a WAN networking environment, the computing environment 20 may include a modem 60 or other means for establishing communications over the WAN 66. The modem 60, which may be internal or external to computing environment 20, is connected to the system bus 38 via the serial port interface 54. In a networked environment, program modules depicted relative to the computing environment 20, or portions thereof, may be stored in a remote memory storage device resident on or accessible to remote computer 68. It will be appreciated that the network connections shown are exemplary and other means of establishing a communications link between the electronic devices may be used.

The new business performance management system and method is typically provided as software running on the processing unit 32, resident in the computer-readable medium of the storage device 42, to allow the processing unit 32 to provide the functionalities described herein. As described below, the software may be provided as a spreadsheet, for example as implemented on a spreadsheet program such as Microsoft Excel, however one skilled in the art would realize that the software may be provided as a stand-alone software program (i.e., implemented in any suitable programming language) operating on the processing unit 32 or any operating system provided therewith, and need not utilize any additional software operating on the system. Alternatively, or in addition, the functionalities may be provided as a combination of software and one or more ASICs to provide the functionalities discussed herein.

In further embodiments, as described below, the functionalities may also be provided as a web-based application running on a browser and accessible via the Internet or other communications network. Alternatively, the functionalities disclosed herein may be incorporated into an Executive Dashboard, described above. In yet another embodiment, the functionalities disclosed herein may be provided as a benchmarking service that analyzes historical data for a plurality of companies. The historical data may reside in a remote database, or may be internal to the benchmarking service. The benchmarking service may provide industry specific data and comparative benchmarks for particular industries, or provide general benchmarks that span multiple industries. In one embodiment, the functionalities are embedded into the architecture of a BPM management system via an information hub 150.

An exemplary BPM architecture 100 is shown in FIG. 1B. The architecture 100 may include various source systems 102, reference data 110, applications 120, and reporting and analysis tools 130 integrated by an information hub 150 that may provide support for collaboration of business units, workflow process management, security, and system administration. The source systems 102 may capture information about the company from various data sources 104 via various methods 106. Exemplary data sources 104 may include Enterprise Resource Planning systems (ERP), which are integrated information system that uses packaged software to serve any or all departments within an enterprise. For example, ERP systems may provide software for manufacturing, order entry, accounts receivable and payable, general ledger, purchasing, warehousing, transportation and human resources departments. Additional exemplary data sources 104 may include legacy systems as well as non-financial and external sources of data, and the like. Exemplary methods 104 for managing data from the data sources 104 may include Extraction, Transformation and Loading (ETL), which may be used copy data between databases of different types, Enterprise Application Integration (EAI), which may be used to integrate applications within the company, Enterprise Intelligence Integration (EII, also known as Enterprise Information Integration), which may aggregate disparate sources 104 of business information into a single analyzable body of information, and the like.

The architecture 100 may also include reference data 110 that may define various definitions, standards, and the like. For example, the company may reference certain KPI definitions 112, reporting hierarchies 114, data standards 116, and code of authorities 118. Applications 120 may also be included to provide strategic analysis in areas such as planning/modeling 122, budgeting/forecasting 124, consolidations 126, and dimensional profitability/ABC 128. Finally, reporting and analysis tools 130 may also be provided to present the analytical results to business managers via useful reports, visualizations, and the like. Traditional BPM systems may provide, for example, reporting tools for external reporting 132, internal reporting 134, and standard reporting 136. Additionally, or alternatively, tools may be provided for ad hoc database querying 138, such as OnLine Analytical Processing (OLAP) software that allows the user to quickly analyze information that has been summarized into multidimensional views and hierarchies, executive scoreboards or dashboards 140, data mining tools 142, and the like. It should be apparent to one of ordinary skill in the art, that the source systems 100, reference data 110, applications 120, reporting and analysis tools 140, and information hub 150 capabilities necessary for a particular company may be implementation dependent, and that exact combination of tools provided may vary greatly without departing from the spirit and scope of the present invention.

Figure 2:
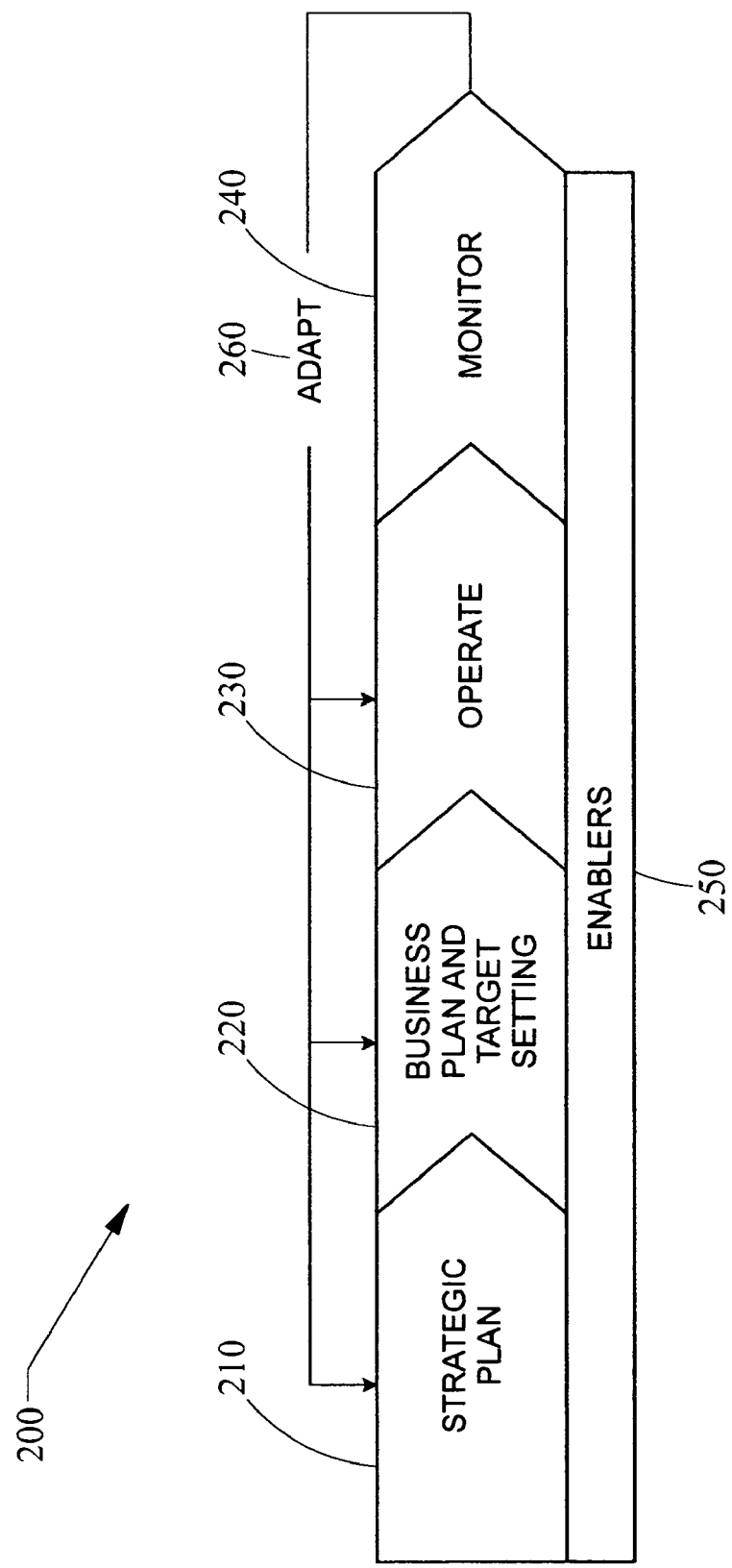
FIG. 2 is a diagram representative of an exemplary EPM technical architecture for implementing one embodiment.

Referring to FIG. 2, an exemplary framework 200 for delivering an integrated BPM system is shown. The framework 200 defines a process to drive strategy through to execution, with results informing periodic adjustments to both long and short term business tactics. The framework includes strategic planning 210, creating a business plan and target setting 220, managing operations 230, monitoring results 240, and enablers 250. The framework 200 also allows each of these areas to adapt 260 as results indicate. Exemplary strategic planning 210 tasks include environmental assessment, competitor assessment, analysis of business opportunities and key capabilities, and long-range financial planning. Exemplary tasks associated with business planning and targeted setting 220 include establishing a direction for products and services, determining the required capabilities, key initiatives, and determining revenue, cost and capital projections as well as budget and operational targets. Exemplary operational 230 tasks include setting operational targets, and managing initiatives, revenues, costs and capital. Exemplary monitoring 240 tasks include analyzing the prior period, forecasting, operational analysis, and dimensional analysis. Exemplary enablers 250 include employee incentives and rewards, and company policies and procedures.

Figure 3:
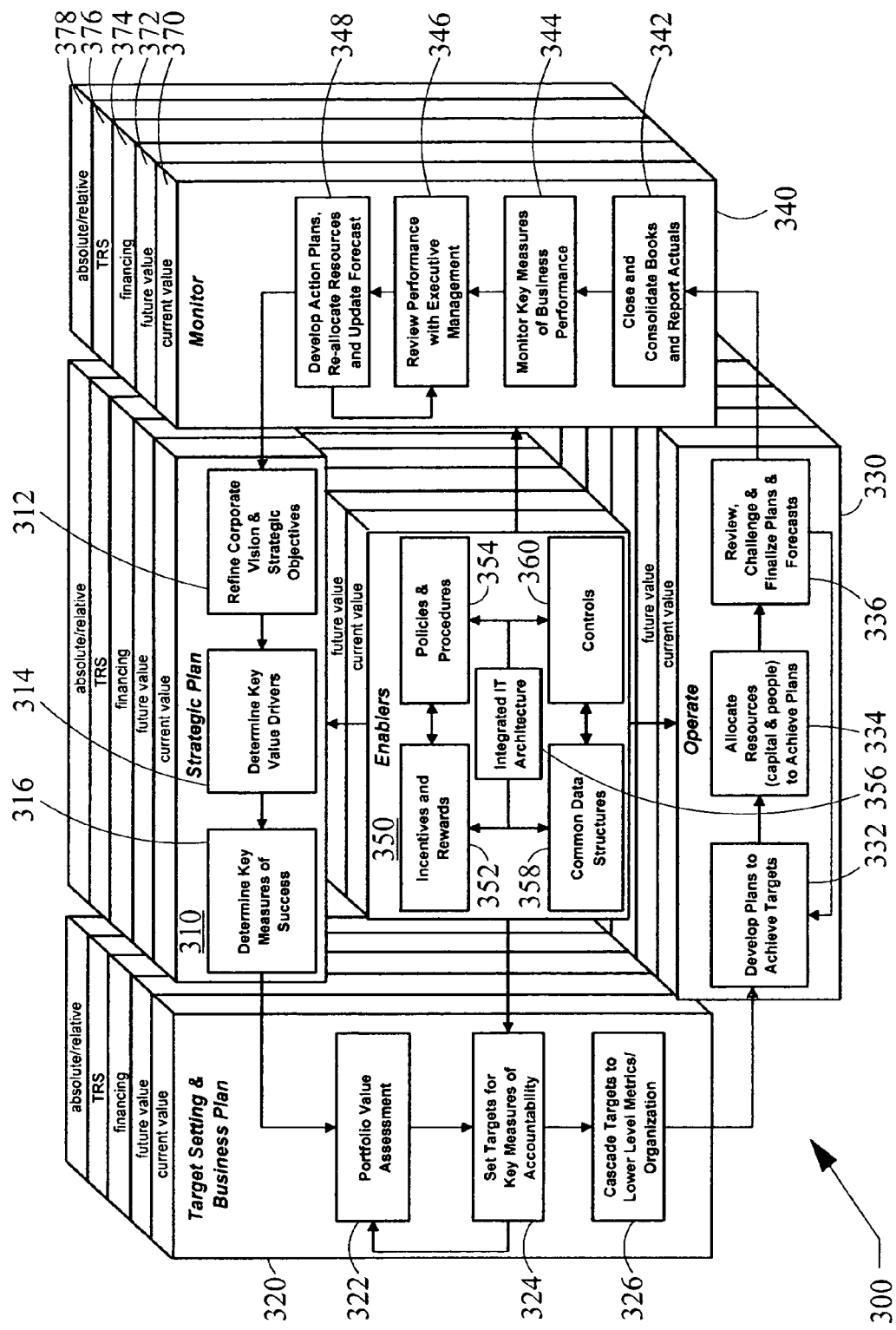
FIG. 3 is a diagram representative of an exemplary framework for delivering an integrated BPM system.

Referring to FIG. 3, an exemplary methodology for implementing the BPM framework of FIG. 2 is shown. As described above, current methodologies focus exclusively on internal performance metrics and current year performance. When utilizing the functionality described below, however, the framework 300 provides a holistic approach to BPM that allows a company to manage business performance across various aspects of its operations and at different levels. For example, a company may want to manage the performance of their business as it effects the company's current value 370, future value 372, financing 374 or TRS value 376, described in more detail below. Alternatively or additionally, the company may wish to see its performance across any of these areas in absolute or relative terms 378, such as raw number analysis, market indices or peer group assessments, respectively. The framework 300 represents the continuous process of strategic planning 310, target setting and business plan development 320, operating 330, and monitoring performance 340 as supported by various enablers 350. An exemplary methodology for strategic planning 310 includes refining corporate vision and strategic objectives 312, determining key value drivers 314, and determining key measures of success 316 activities. The functionalities disclosed herein may find particular use in the strategic planning 310 phase when refining the corporate vision and strategic objectives 312, for example, when analyzing investor expectations, key competitor information and current and future business performance. Similarly, the functionalities disclosed herein may be used to determine the key value drivers 314, for example, by providing a mapping of the value drivers to various performance metrics, and for determining the key measures of success 316, for example, by aligning those measures with shareholder value creation to create cause and effect maps.

An exemplary methodology for target setting and business plan development 320 includes portfolio value assessment 322, set targets for key measures of accountability 324, and cascade targets to lower level metrics/organization 326 activities. As described in more detail below, the functionalities disclosed herein may find particular use in setting targets for key measures of accountability 324, for example, by aligning top down targets with shareholder expectations and ensuring the consistency of external and internal targets. Similarly, the functionalities disclosed herein are ideally suited to cascade the targets to lower level metrics 326.

Exemplary methodology activities for operations 330 include developing plans to achieve the specified targets 332, allocating resources (in terms of both capital and man-power) to achieve all business plans 334, and reviewing, challenging, and finalizing plans and forecasts 336. The functionalities disclosed herein facilitate each of these activities 332, 334, and 336 by providing a clear mapping of target values to business and operational drivers to enable bottom-up resource allocation in line with the established target values.

An exemplary methodology for monitoring performance 340 includes activities for closing and consolidating books and reporting actuals 342, monitoring key measures of business performance 344, reviewing performance with executive management 346, and developing action plans, re-allocating resources and updating forecasts. The functionalities disclosed herein facilitate performance monitoring 340 by providing a consistent system for measuring the performance of the company and a simple user interface to determine exceptions and root causes of poor performance. Coupling these functionalities with a balanced scorecard or executive dashboard, as mentioned above, further enhance these advantages.

Finally, exemplary methodology activities for enablers 350 include establishing, analyzing, and adapting employee incentive and rewards programs 352 and policies and procedures 354, and providing an integrated IT architecture 356, such as the architecture describe above in reference to FIG. 1B, or other software solution projects that utilizes an effective set of common data structures 358 and controls 360.

In order to overcome the disadvantages of the prior art BPM systems, the financial performance metrics used to analyze a company's business performance should take an external view of the company's current and future value. One such external performance metric is the Total Return to Shareholders (TRS), and is defined as the company's equity plus any dividends paid on the stock. TRS can be calculated for a given shareholder by adding dividends to any stock price appreciation and dividing the resultant value by the shareholder's original investment. Coupling the external metric TRS with internal metrics of performance allows the company to see exactly what drives shareholder value.

Figure 4A:
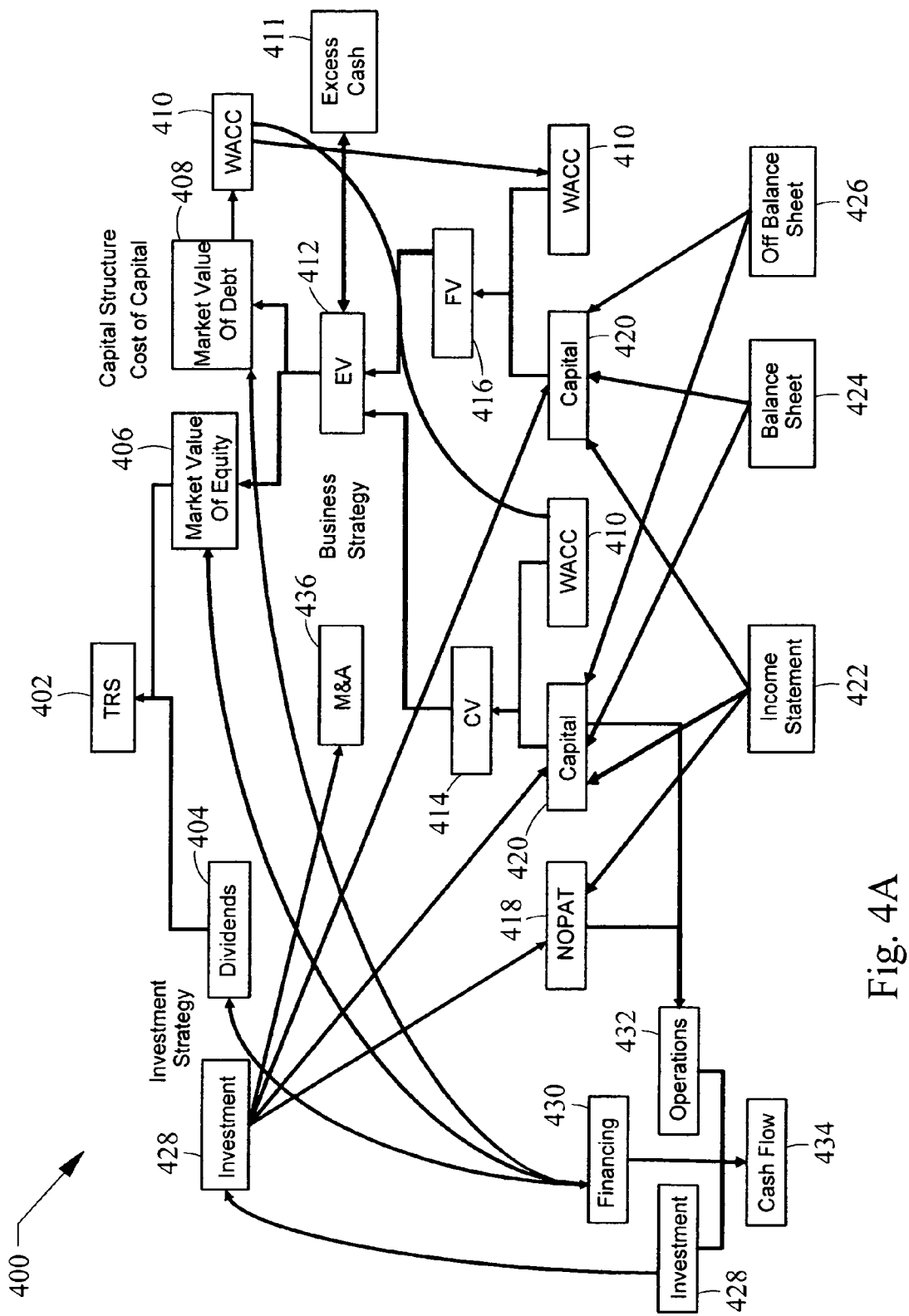
FIG. 4A is a diagram representative of one embodiment of a Total Return to Shareholder (TRS) map depicting exemplary interrelations between internal and external business metrics.

FIG. 4A shows an exemplary flowchart detailing the coupling of TRS with internal performance metrics and the inter-relationships therein, also known as a TRS map 400. As described above, TRS 402 includes dividends 404 paid on the stock as well as the company's market value of equity or MVE 406. MVE 406 can be calculated by shares outstanding times share price. A company's debt 408 to equity structure influences its Weighted Average Cost of Capital 410 (WACC). The total market value of the company (MV) may be defined as the MVE 406 plus the market value of the debt 408.

Enterprise Value (EV) 412 (EV=MV less excess cash, 411) can be decomposed into Current Value 414 (CV) and Future Value 416 (FV). The CV 414 represents the current value of the company. The CV 414 is influenced by the company's Net Operating Profits Less Adjusted Taxes 418 (NOPLAT), capital 420, and WACC 410, and can be calculated by dividing the NOPLAT 418 by the WACC 410 (which is also equal to Capital 420+EP/WACC 410), such that CV 414=NOPLAT 418/WACC 410=Capital 420+EP/WACC 410. The FV 416 represents the future value of the company, or the difference between the EV 412 and the CV 414. The FV 416 is influenced by capital 420 and the WACC 410, and can be calculated by subtracting the CV 414 from the EV 412, such that FV=EV−CV. As further detail in FIG. 4A, the capital 420 includes both balance sheet 424 and off-balance sheet 426 components. Additionally, income 422 may influence capital 420 as well as the NOPLAT 418.

The data underpinning these performance metrics also have an effect on the cash flow 434 of the company. Cash flow 434 is determined by the investments 428 made in the company, any financing arrangements 430, as well as operations 432 results. The operations 432 results are influenced by the NOPLAT 418 and the capital 420. Financing arrangements 430 influence the equity 406 of the company, its debt 408, and the ability of the company to pay dividends 404. This may affect the decision of investors to make an investment 428 in the company, which may affect the NOPLAT 418, capital 420 and Mergers and Acquistions 436 (M & A) of the company.

Figure 4B:
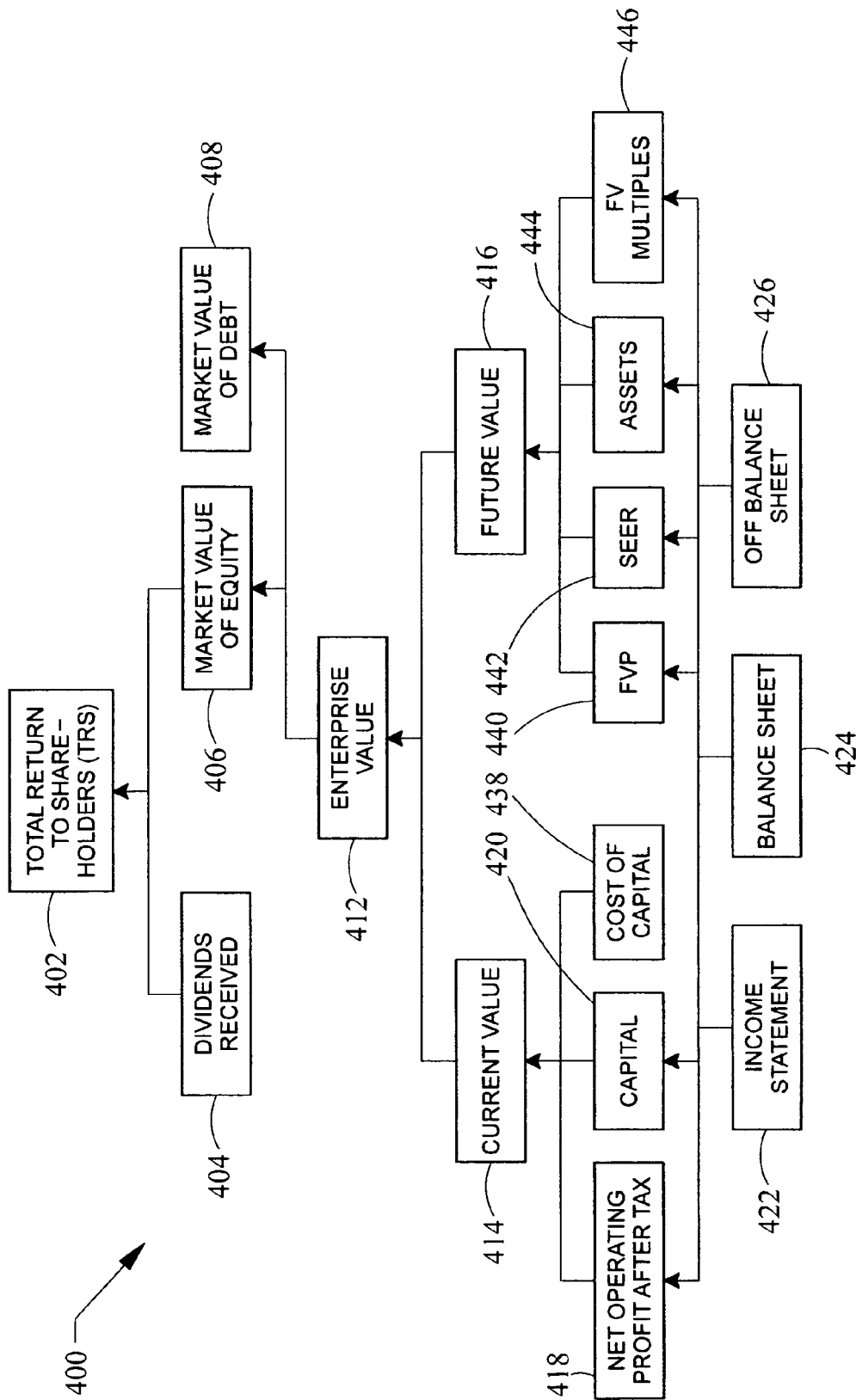
FIG. 4B is a diagram representative of a second embodiment of a TRS map depicting exemplary interrelations between internal and external business metrics.

FIG. 4B depicts an alternative embodiment of the TRS map 400. In the embodiment of FIG. 4B, the FV 416 may be further broken down into component parts via a variety of methods, each of which attempt to define the true drivers of FV 416. For example, one may use an FV premium 440 methodology to determine a company's FV 416 growth relative to the growth of the economy (segment or index) generally. In one embodiment, the FV premium methodology 440 may decompose the FV 416 value into three components: a first component that represents an operating advantage/disadvantage for the company; a second component that defines a projected rate of growth for the economy in general; and a third component that defines the remainder of FV 416 in the company.

In the FV premium methodology 440, the first component may represent an operating advantage/disadvantage for the company. This component may define whether the company is creating or destroying value in the current period, and may be calculated, for example, by calculating a company's economic profit (EP) capitalized (EP/WACC). As described in more detail below, EP may be calculated as a company's NOPLAT less a capital charge for the company, where the capital charge may be defined as a company's invested capital times a WACC for the company, such that EP=NOPLAT−(Invested Capital*WACC). If this value is negative, the company is operating at a disadvantage and is destroying the value of capital entrusted to the company. If this value is positive, the company is operating at an advantage and has generated a premium over the value of capital that is embedded in the company's CV 414. This first component thus defines the portion of FV 416 explained by investor's expected improvement to breakeven EP.

The second component of the FV premium methodology 440 may define an implied growth of the economy in general. It should be apparent to one of ordinary skill in the art that this component may also define an implied growth rate for a particular market, market segment, industry, peer group, and the like. Additionally, this component may be determined using a variety of methods, each of which may be dependent on the market, market segment, etc. being analyzed. In one embodiment, the second component may represent an implied growth in the economy as determined by a terminal value calculation based on the US Gross Domestic Product (GDP). Typically, the terminal value of a perpetually growing firm may be defined as the Free Cash Flow of a company for the next period divided by WACC minus a terminal growth rate, or $FCF_{t+1}/(WACC-g)$. By substituting a breakeven NOPLAT value, or the point at which zero EP is being generated, for the Free Cash Flow of the company ($FTF_{t+1}$) and the historical growth rate of the US GDP for the terminal growth rate (g), one can determine that portion of a company's FV 416 implied by the growth rate of the economy. In one embodiment, the breakeven NOPLAT may be defined as a company's invested capital times WACC, such that the portion of a company's FV 416 attributable to the implied growth of the economy may be calculated by the following equation: (Invested Capital*WACC)/(WACC−g). An exemplary growth rate for the US GDP is 3.41%, adjusted for inflation.

The third component, or the FV premium component, of the FV premium methodology 440 includes the remainder of any FV 416 not explained by the first two components, or the FV 416 of the company minus that portion of FV 416 explained by the implied growth of economy minus any FV 416 explained by an operating disadvantage. For companies operating at an advantage, the FV premium component may be defined as the FV 416 of the company minus that portion of FV 416 explained by the implied growth of economy. A positive FV premium component indicates that the company is outperforming the economy, market sector, industry, or the like, while a negative FV premium component indicates a growth rate below what is to be expected.

Alternatively, or additionally, other methodologies may be used to further analyze the FV 416 of a company. Exemplary methodologies include a SEER© methodology 442 that defines the drivers of FV 416, an asset methodology 444 that breaks down FV 416 by each company asset that drives FV 416, and an FV multiples methodology that analyzes a companies investments in the drivers of FV 416 to suggest investment strategies that may maximize FV 416. Each of these methodologies is described in more detail in U.S. Patent Publication No. 2005/0209942 entitled "Future Value Drivers," to John J. Ballow et al., filed on Mar. 2, 2005, the entire disclosure of which is hereby incorporated by reference.

Figure 4C:
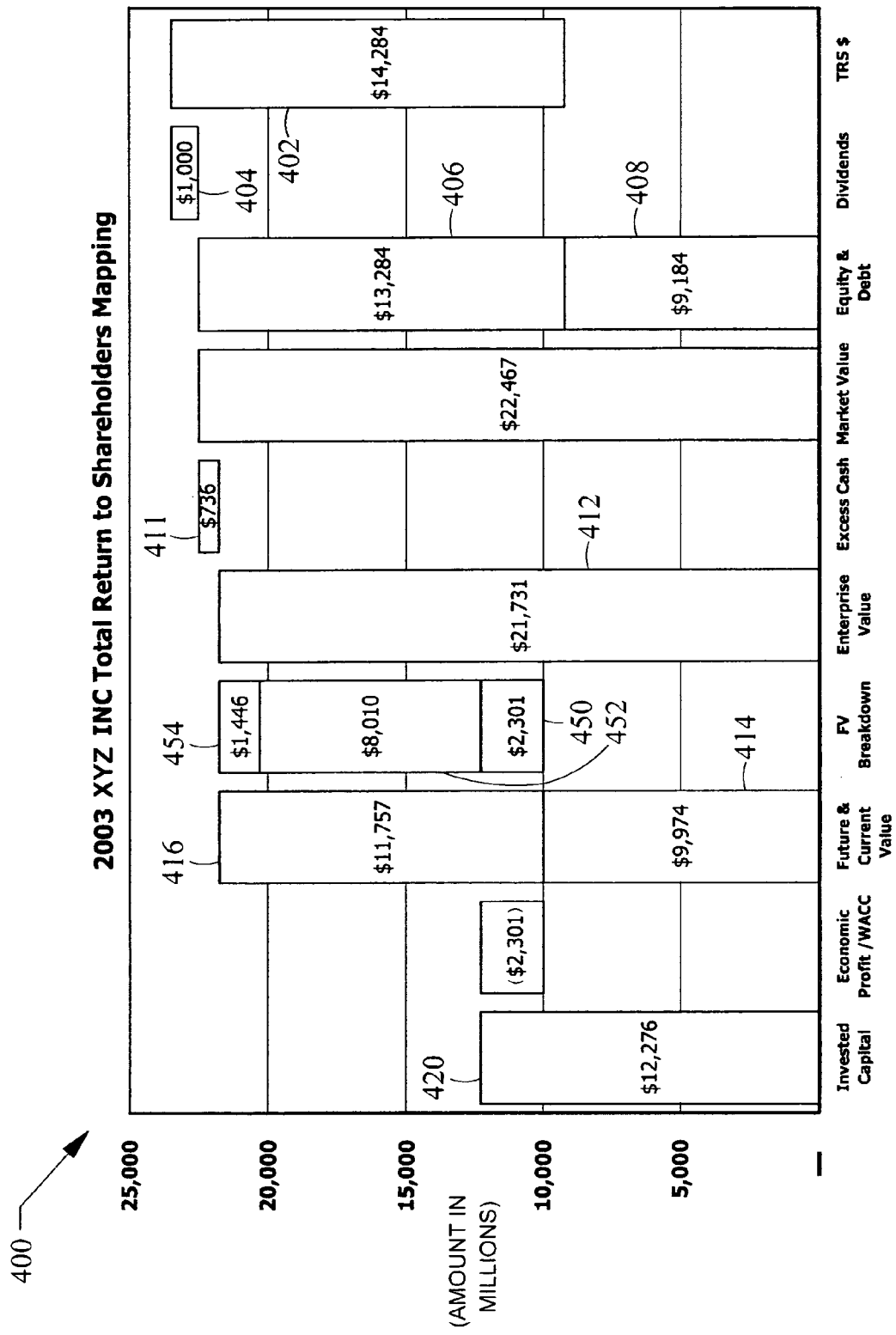
FIG. 4C is a diagram representative of a third embodiment of a TRS map depicting exemplary interrelations between internal and external business metrics.

Referring now to FIG. 4C, an exemplary visualization for displaying a TRS map 400 is shown. In the embodiment of FIG. 4C, a bar graph is used to visually convey the various components of a TRS map 400 to a user, and may be used to explain the TRS 402 for a particular period of time. For example, assume a company had a TRS 402 of $14,284 for a given period while paying $1000 in dividends 404 over that same period, resulting in a market value of equity 406 equal to $13,284. Further assuming a market value of debt 408 for the company of $9,184, the total market value of the company may be calculated at $22,467. Subtracting any excess cash 411 for the period leaves an enterprise value 412 of $21,731. If the company has an invested capital 420 of $12,276 and EP/WACC of ($2301), it can be calculated that the company's equity value 412 includes $9,974 of CV 414 and $11,757 of FV 416. Using the FV premium methodology 440, one can determine that the various components of FV 416 include a first portion 450 of $2,301 based on the expectation that the company will reach a breakeven economic profit, a second portion 452 of $8,010 based on an expected growth of the economy generally, and a third portion 454 of $1,446 which represents an expectation that the growth of the company will exceed that of the economy.

In FIGS. 5A-B an exemplary TRS statement is shown. This TRS Statement 500 provides detailed calculations on the historical performance of a company broken out in several sections corresponding to Current Value, Financing, Enterprise Value, Future Value, Total Economic Profit and Total Return to Shareholders. The metrics shown on this report may be generated by the external reporting module 132 or standard reporting module 136 shown in the architecture 100 of FIG. 1B, where these modules incorporate the TRS Framework analytics. This statement 500 is useful for management in setting targets for future corporate performance.

Referring again to FIGS. 5A and 5B, the TRS statement 500 includes details for of Total Economic Profit (TEP) 510. TEP represents one metric for annualizing and managing current and future value that bridges the gap between internal performance metrics and external metrics such as TRS. The TEP 510 of a company may be defined to include economic profit portions attributable to the current year, future value, capital charges, financing, and the like, or any combination thereof. The TEP 510 may be calculated for a given year, such as for tracking historical performance 520 of a company, or may be calculated for the enterprise as a whole. Additionally, change percentages 522 for the TEP may also be calculated. In one embodiment, the TEP 510 may also be used for target setting 530, described in more detail in U.S. Patent Publication No. 2005/0209944 entitled "TRS Target Setting," to John J. Ballow et al., filed on Mar. 2, 2005, the entire disclosure of which is hereby incorporated by reference. In the embodiment of FIGS. 5A-B, the TEP 510 is calculated by adding an EP 502 component, an invested capital charge 504, an EP of FV component 504, and an EP of financing component 504.

The EP 502 component defines economic profit for the current value of the company for the given period, and may be calculated by multiplying the invested capital 540 of a company by its WACC 542 and subtracting the resultant value from company's NOPLAT 544. The invested capital charge 504 may be calculated by multiplying the company's invested capital 540 by the company's WACC 542. The Economic Profit of Future Value (EP of FV) 506 represents the economic profit of future value component 510 and may be calculated by multiplying the FV 546 of the company by its WACC 542. Optionally, the EP of finance 508 represents the portion of EP attributable to the company's financing arrangements. In one embodiment, the EP of finance 508 may be calculated by multiplying the dividends 548 paid for the period by the total number of outstanding shares 550 and dividing the resultant value by the company's WACC 542, such that the EP of finance 508=(Dividends per Share*Outstanding Shares) *WACC/WACC. Finally, the TEP 510 is calculated by adding the EP of CV 502, the capital charge 504, the EP of FV 506, and the EP of finance 510, so that the a capitalized change in TEP for a given period is equal to the TRS for that period.

The TEP can then be used to calculate the TRS for a given year. The TRS change for a given period can be calculated in dollars by calculating the change in TEP for the period (TEP at the end of the period minus TEP at the beginning of the period) and dividing the result by the WACC. Next, any change in debt is subtracted from the resultant value, and finally the dividends are added, such that the TEP ($)= (TEP2−TEP1)/WACC−Change in Debt+Dividends.

These calculations may also be represented as follows:

$$TRS\ \%\ \$ = MV2 - MV1 + Dividends \quad (Eq.\ 1)$$

$$TRS\ \% = (MV2 - MV1 + Dividends)/MV1 * 100 \quad (Eq.\ 2)$$

Where MV2 is the market value of equity at the end of the period, MV1 is the market value of equity at the beginning of the period and dividends are issued during the period.

$$EP = NOPLAT - (Capital*WACC) = EP \text{ of } CV \quad (Eq. 3)$$

$$CV = NOPLAT/WACC = Capital + EP/WACC \quad (Eq. 4)$$

$$MV = Equity + Debt = EV + \text{excess cash} = cv + fv + \text{excess cash} \quad (Eq. 5)$$

$$EV = equity + Debt - \text{excess cash} = mv - \text{excess cash} \quad (Eq. 6)$$

$$FV = EV - CV = Equity + Debt - EP/WACC - \text{capital-excess cash} = Equity + Debt - NOPLAT/WACC - \text{excess cash} \quad (Eq. 7)$$

$$EP \text{ of } FV = FV*WACC (\text{Decapitalizing Future Value}) \quad (Eq. 8)$$

$$TEP = Capital*Wacc + EP \text{ of } CV + EP \text{ of } FV + EP \text{ of Financing} \quad (Eq. 9)$$

$$TRS = (TEP2/WACC2 - TEP1/WACC1) - 1 \quad (Eq. 10)$$

Using annual TRS calculations allows a company to set target TRS values and decompose the TRS target (or shareholder expected returns) into values for Operating Capital and performance (CV), Growth (FV), and Financing. These additional values can then be further broken down, as described below. Indexing can be used to show performance in absolute and relative terms.

An exemplary TRS target worksheet using the TEP metric is shown in FIG. 6. Although the exemplary TRS worksheet of FIG. 6 contemplates TRS target setting, it should be apparent to one of ordinary skill in the art that a similar worksheet could be used to track historical performance of a company's TRS as well. Initially, a desired growth rate 602, dividend payment percentage 604, and debt/equity ratio 606 are established. In the example of FIG. 6, the company desires a ten percent growth rate 602, a five percent dividend payment 604, and a debt/equity ratio 606 of forty percent. Target TRS percentage changes 610 are then established for each of the desired year based on the growth percentage 602. Next, the TRS percentage changes 610 are converted to TRS dollar amount changes 612 for each year. The dividend targets 614 are calculated based on the desired dividend rate 604. Finally, the equity 616 and debt 618 values are calculated as a function of the desired debt/equity ratio 606. As the cost of equity (ke) is embedded in the WACC, setting a TRS target=ke assures meeting investor expectations ie. equity growth at ke.

From these values, the equations described above can be used to establish target values for additional performance metrics. These include targets for EV 620, EP of CV 622, FV 624, EP 626, EP of FV 628, and TEP 630. Finally, the annual TRS dollar change 632 can be calculated as a function of the TEP targets 630 to verify the calculations. These targets can then be decomposed further into targets for the drivers of each of these metrics to help the company reach these targets.

As noted above, the decomposition and mapping of the current and future value components of the total return to shareholders along with associated business processes or business components that drive those values provides valuable software tools for use in analyzing business performance and in managing the operation of those business components. As used herein, a business component may be an organizational sub-division of a company or enterprise. A business component also may be a business process within an enterprise that may be analyzed as an independent operation from a financial perspective.

In one embodiment, for example, a software tool may be provided on a laptop computer for use by a business consultant. In person-to-person interviews with a client, financial data may be input into a computer having a spreadsheet programmed to perform the calculations noted above. The spreadsheet may execute the calculations and presently generate reports on the display of the laptop for review by the consultant and client. The decomposition of shareholder value into component parts may displayed in graphical hierarchical maps that provide powerful depictions of hypothetical scenarios of the effect that drivers of business components have on current and future enterprise values.

In another embodiment, the program executing the calculations may be resident on computer-readable medium in a server in communication with a privately accessible data communication network, such as the internet or a WAN. The program may be accessed through a computer having a browser based interface to implement the same scenario identified above, or scenarios identified below.

Using the above spreadsheet or similarly programmed software tool implementing the method of this invention, one may quickly identify business component values that under perform industry benchmarks or corporate targets. The identified components may be candidates for further analysis to determine whether technology solutions may be provided to raise performance standards and enhance shareholder value. The spreadsheet or other software tool may include a library of standard technology solutions associated with each business component. Such solutions may be displayed or included in a report generated that describes the identified underperforming component and solutions that require further analysis for implementation to achieve benchmark or other target performance.

In yet another embodiment, the invention may be implemented in an enterprise as part of the business management software. A computer in communication with the financial accounting system may import financial data representative of the performance of a plurality of business components. The financial data may be manipulated to correspond with business components according to a map of business components identified as driving current or future value of shareholder returns. The financial data may then be analyzed in accordance with this invention to determine and display the expected actual shareholder return driven by the actual performance. Such data may be graphically displayed in a hierarchical map, or in the form of an executive dashboard. The actual performance financial data may be displayed along side with target values for various business component values. Colors, such as green, yellow, or red, for example, may be used to identify the relative performance, such as above, below, or greatly below target values assigned to individual business components. Additionally, acceptable tolerances for each business component target value may be established and reflected in the display. Such tools may be useful when integrated as monitoring tools into the business performance management frameworks, such as described in association with FIGS. 2 and 3.

In still another embodiment, the invention may be implemented in the form of a financial data provider. A database containing a historical store of financial data of corporation may be in communication on a publicly accessible network. For a fee, financial analysts may access such data and, using the software tools with on their own systems or on a server dedicated to this database, the financial analysts may map the components of shareholder value across broad swaths of industry segments. Also, the financial analysts may focus on a specific industry to determine industry benchmarks of component values. Those component benchmarks may be applied to generate financial report maps used for comparison purposes in making investment decisions with a specific company. Alternatively, the benchmarks may be used for comparison to identify which business components within a company are underperforming competitors, to enable business mangers to determine which business components require additional resources to maintain competitive performance levels.

In an alternative embodiment, the invention may be implemented in the form of target setting, forecasting, and budgeting tools in which targets are selected at a high level of management through a process of strategic planning to select targets based on a combination of value, such as TRS value for example, expected to be added and manageability of the candidate targets. In one embodiment, computer simulations of, inter alia, increased cash flows expected by the target strategies. These targets may then be flowed down to the various levels of management, budgets may be constructed around those target strategies, and the budgets may be consolidated and flowed upward. Alternatively, or additionally, the system may be used to increase shareholder value by improving forecasting abilities through the use of graphical representations of performance metrics of similarly situated companies in order to identify realistic value enhancing business strategies as goals for the organization. Exemplary systems of these types include those described in U.S. Patent Publication Nos. 2004/0073441 A1 and 2004/0073477 A1, both to Heyns et al., the entire disclosures of which are hereby incorporated by reference.

In still another embodiment, the invention may be implemented in a system for automatically examining a company's financial data and evaluating factors affecting the company's stock value. The system may, for example, evaluate a company's spread through that company's debt and equity costs and measure returns to investors from company growth, which may be either organic growth or growth through mergers and acquisitions. The system may also evaluate the financial data of other publicly traded companies, such as those in the same industry, and compares the various factors affecting stock value. The system may also include tools for determining the return to investors, such as a software-based application that collects receives financial data and uses this information to calculate the return to inventor through the company's spreads and growth. An exemplary systems of these types include those described in U.S. Patent Publication Nos. 2005/0004832 A1, to Ostergard et al., the entire disclosure of which is hereby incorporated by reference.

In view of the shortcomings noted above of conventional financial reporting to communicate an accurate picture of a company's current and future values, as well as the management of the key drivers of future value, yet another embodiment of the present invention is provided. The invention may be advantageously implemented to enhance the financial statements that publicly traded companies provide to the public and government regulatory agencies, or may be used by investment analysts to enhance the financial statements provided by the publicly traded companies. Thereby, an Enhanced Business Reporting (EBR) methodology incorporates the TRS Mapping analytical framework for generating the enhanced financial statements. The EBR methodology is based on TRS Mapping framework's forward-looking economic principles, namely that a company's stock price is based on the market's expectations about future earnings and incorporates the forward-looking perspectives of management and key stakeholders on factors impacting shareholder value. In particular, EBR methodology is based on a comprehensive framework, using the above-described enhancements to widely known principles such as Total Return to Shareholder (TRS), Total Economic Profit (TEP), and concepts of Current Value and Future Value.

Preferably, companies will implement a TRS Mapping Framework to explain the underlying constructs of shareholder value for their company. Then, the EBR methodology provides that conventional financial reports are supplemented with several additions to the financial statements and include six supplementary financial reporting items. These will provide a clear method for understanding shareholder value accretion period-on-period as well as the expectations for future growth in TRS embedded in the share price, as explained in more detail below.

Figure 7:
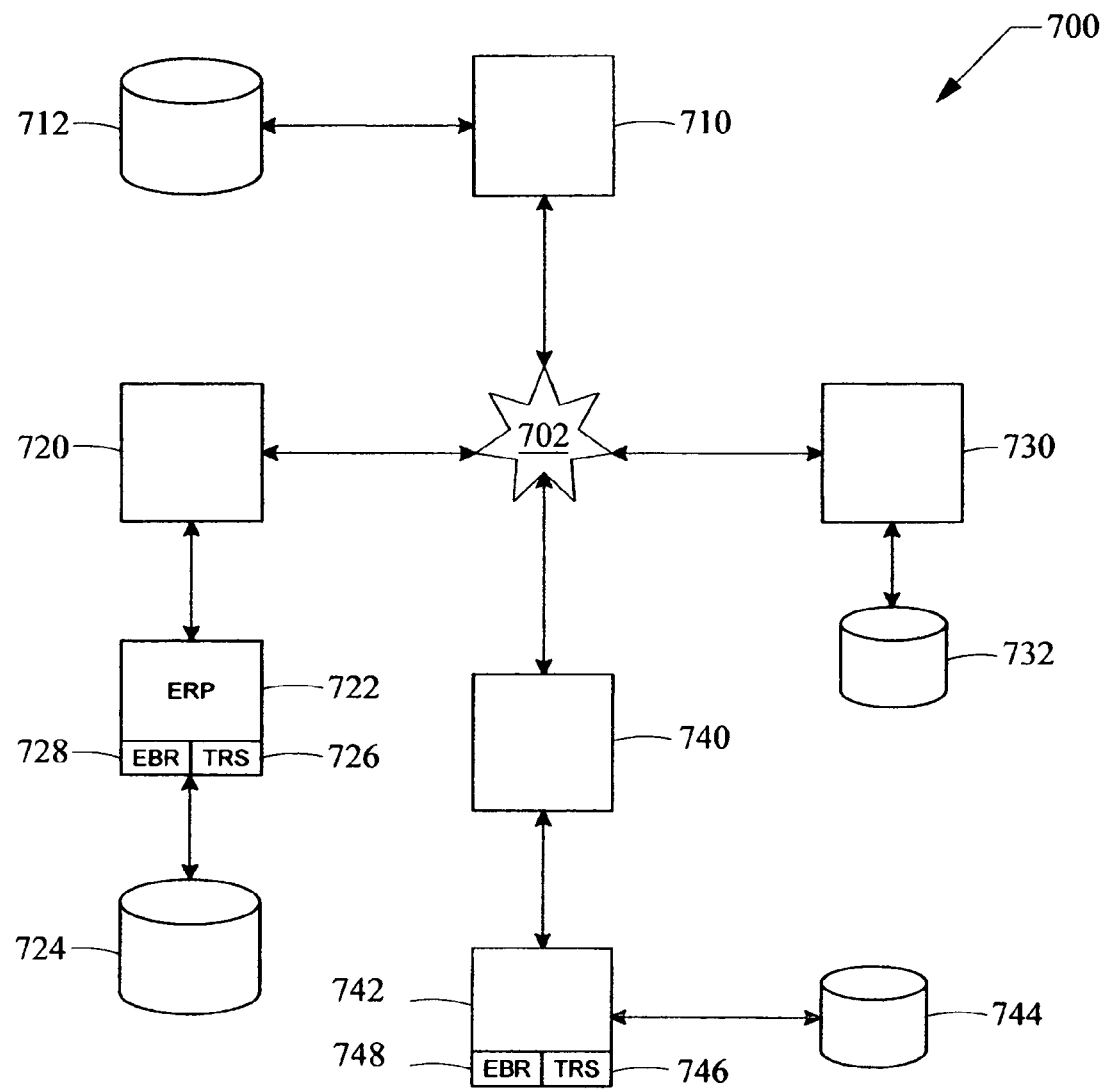
FIG. 7 is a diagram representative of a system for generating financial statements in accordance with an enhanced business reporting methodology.

In reference to FIG. 7, a representative system 700 for generating and reporting financial statements using the enhanced business reporting methodology is shown. The system includes a server 710 at a financial data provider with a large data store 712 of the reported financial data and prices of publicly traded financial instruments of publicly traded companies. Preferably, the data store contains historical data that may be provided or sold to others. The server 710 is connected to a publicly accessible data network 702, such as the internet.

A server 720 at a publicly traded company is in communication with the network 702. The server 720 is coupled with a computer 722 operating an enterprise resource planning system, a business performance management system, or internal financial accounting system of the likes described above. The computer 722 is in communication with a database 724 containing the companies current and historical accounting and financial data. The computer 722 includes a TRS module 726 and an enhanced business reporting (EBR) module 728. The EBR module uses the algorithms in the TRS module for collecting the appropriate financial or accounting data and calculating the TRS metrics as discussed above. The EBR module gathers those metrics and generates a supplemental financial report that supplements the conventional generally accepted periodic corporate financial reports, such as 10-K's, 10-Q's and the like. The conventional financial reports and supplemental enhanced reports may be provided to the general public through the network 702 or delivered to the computer 730 of the appropriate government regulatory agency, such as the SEC., which stores the reports in a data store 732. The government may make the supplemented reports publicly available through conventional distribution channels.

Optionally or alternatively, the conventional periodic corporate financial reports may be obtained by servers 740 at private investment analysts firms that analyze publicly traded companies and provide investment recommendations for private investors or the public. The servers 740 are in communication with a computer 742 that contains financial analytical tools. Among the tools are a TRS mapping module 746 in communication with an EBR module 748. These two modules provide the algorithms for calculating the enhanced financial metrics and generating supplemental financial reports to supplement the conventional periodic corporate reports, which are obtained and stored locally in the data store 744, along with other historical financial data as may be obtained, for example, from the server 710 of the financial data provider. To the extent that there are no regulatory requirements for the publicly traded corporation to provide the enhanced supplemental financial reports, the investment analyst firms may generate the reports for their own use in making a more informed investment decision, and/or may make the supplemental financial statements available to others. Even if the publicly traded corporations are required to provide the supplemental financial reports, the investment analysts firm may choose to use the TRS and EBR modules to calculate estimates of financial metrics expected in future supplemental financial reports to be provided by the corporations.

To report TRS, Total Economic Profit (TEP) and the key drivers of Current and Future Value in the supplemental financial reports, the EBR methodology rests on the forward-looking realities of most company stock prices, which are now based on the market's future expectations (including discounted cash flows, dividend distributions, price appreciation, etc.). Those forward looking realities are founded on the financial metrics derived from the TRS Mapping Framework analytics, which are described in detail above. Preferably, the financial reports incorporating the EBR methodology will also include the future perspectives of management and key stakeholders—on financial and non-financial metrics, and on related causal factors impacting shareholder value. Accordingly, the financial reports used to status for regulatory needs may incorporate FLS, MD&A and supplementary disclosures that will include the relevant metrics that management uses internally to manage both Current and Future Value of a business.

The preferred embodiment of the EBR methodology adds four statements to the conventional reported financial statements that are directly complementary to the traditional reporting instruments (Income Statement, Balance Sheet, Statement of Cash Flows and Statement of Stockholder's Equity). These EBR statements are as follows: (1) Statement of Total Economic Profit (TEP), shown in FIG. 8; (2) Statement of Enterprise Value, shown in FIG. 9; (3) Statement of Total Return to Shareholders (TRS)—Unadjusted, shown in FIG. 10; and (4) Statement of Total Return to Shareholders (TRS)—Adjusted, shown in FIG. 11. Other embodiments of the EBR methodology may use more or less statements to present some of the same financial metrics. Accordingly, the present invention is directed to any combination or statements that present similar financial metrics. The statements may be reported in a humanly readable form in a printed publication on paper or in electronic form for a computer display, or the statements may be in the raw data in electronic form on computer-readable media, or carried in a data signal.

To generate these supplemental financial reporting metrics, the EBR methodology preferably includes several, preferably six, incremental requirements to traditional financial reporting that derive in part from the TRS Mapping framework. The incremental requirements include, but are not limited to, the following:

1. Calculations and adjustments to arrive at Net Operating Profit After Tax (NOPAT);
2. Calculation of Weighted Average Cost of Capital (WACC);
3. Calculation of Return on Invested Capital (ROIC);
4. The calculation of Invested Capital, which may have significant adjustments that include but are not limited to operating leases, goodwill and potentially stock options;
5. Adjustments for off balance sheet financing have to be incorporated into the Market Value of Debt; and
6. Disclosure of market capitalization data, specifically methodologies and sources of Beta.

An ERP system 722, or other financial management system, as shown in FIG. 7, may include an EBR module 728 with a TRS Mapping Framework analytics module 726 programmed to include these incremental requirements as a supplement to the conventional financial reporting requirements. Preferably, the TRS module is configured to instruct the data processor on the computer to perform the basic calculations in accordance with the TRS Mapping framework. Preferably, the EBR module is configured to generate the supplemental statements based on the TRS module calculations, and perform any supplemental calculations not performed by the TRS module. These modules may be separate or integrated into a single comprehensive module.

Referring to FIG. 8, the Statement of Total Economic Profit (TEP) 800 is illustrated as it may appear on a computer display. The purpose of this initial statement is to directly link EBR with traditional financial reporting information, such as found in the Income Statement 422, the Balance Sheet Statement 424 and the Off-Balance Sheet Statement 426, which are noted in FIGS. 4A and 4B. Therefore, Earnings before Interest and Taxes (EBIT) 802 is a key starting point. Preferably, this statement also reports Net Operating Profit After Tax (NOPAT), Weighted Average Cost of Capital (WACC), Economic Profit of Current Value (EPCV), Economic Profit of Future Value (EPFV) and Total Economic Profit (TEP). These metrics are reported at least for the current period 804 and optionally for the prior period 810. Preferably, the statement includes the both the current and the prior reporting period change in absolute 806, 812 and percentage terms 808, 814. Optionally, the figures reported under "Additional Disclosure" 816 included in this embodiment of the statement is to provide an alternative perspective on how Economic Profit of Current Value (EPCV) is determined by applying the spread between Return on Invested Capital (ROIC) and Weighted Average Cost of Capital (WACC) to Invested Capital. EPCV is the same in concept to residual income or Economic Profit. Additionally, there can be disclosures to further support the calculation of Cash Taxes (since adjusted for interest income, interest expense, operating leases, retirement liabilities and other items), Invested Capital, WACC and ROIC.

Referring to FIG. 9, the Statement of Enterprise Value 900 is illustrated as it may appear on a computer display. Conceptually, moving up along the TRS Map of FIGS. 4A and 4B, the Statement of Enterprise Value 900 reconciles the market's valuation of current operations and growth, which are reflected in the Current Value 414, Future Value 416 and Enterprise Value 412. The market value of equity 902 is simply computed by multiplying the closing stock price by the number of shares outstanding at the end of the stated reporting period. This information links the Statement of Stockholder Equity to the capital markets and is a compliment to the SEC disclosure for "*Market Registrant's Common Equity and Related Stockholder Matters*" where only the high and low stock price in the period are disclosed. The financial metrics are included for the current year 904 and prior year 910, with the change for the current period and prior period reported in absolute 906, 912 and percentage 908, 914 terms. The metrics reported under the "Additional Disclosures" 916 for this statement can further detail the market value of debt as part of determining enterprise value since it will include both on and off balance sheet items that will need to be explained.

Below the enterprise value, this statement focuses on reporting the split between current and future value. The system computes the current value portion of Enterprise Value based on using the WACC to capitalize the Economic Profit of Current Value into perpetuity and then adding invested capital. Current Value is a proxy for the market's valuation of the current operations of the company—i.e., the anticipated future cash flows accruing from the activities the company will be pursuing. Once Current Value is computed, Future Value is then calculated by subtracting Current Value from Enterprise Value. Future Value is a proxy for the capital market's expectations of future growth. Preferably, the statement also includes the debt to equity ratio as a supplementary disclosure since changes in levels of debt will have a direct impact on the equity shareholders.

Referring to FIG. 10, the Statement of Total Return to Shareholders-Unadjusted 1000 is illustrated as it may appear on a computer display. This statement links with the Statement of Enterprise Value by starting with the Value of Economic Profit of Current Value (EPCV) in Perpetuity 1002. To reconcile Enterprise Value to TRS, the equity portion of Enterprise Value needs to be analyzed to reflect the market's implied valuation of current and future value inherent within the closing period stock price. The financial metrics are included for the current year 1004 and prior year 1010, with the change for the current period and prior period reported in absolute terms 1006, 1012 and percentage terms 1008, 1014. The Statement of Total Return to Shareholders-Unadjusted 1000 provides the key perspective of the relative impact of current and future value in the closing share price at the end of a period. Further, by using TRS Mapping Framework methodology, company management will have robust analytical tools to support their commentary on the period changes in TRS, based on their improved insight and understanding of the key value drivers and resource types applicable to their business model and industry.

Referring to FIG. 11, the Statement of Total Return to Shareholders-Adjusted 1100 is illustrated as it may appear on a computer display. This statement reconciles the TRS performance with the overall stock market movement to present company TRS performance against overall market performance in the period. The S&P 500 index 1102 is used as the basis of overall stock market movement. Alternatively, other relevant industry-based market indices could be used. The company's "Beta" 1104 is reported to reflect the historical movement of the company stock price with the reported market index. For transparency, when these statements are used for regulatory reporting, the MD&A should comprehensively disclose the methodologies and sources of Beta The financial metrics are included for the current period 1106 and prior period 1010, with the change for the current period and prior period reported in percentage terms 1008, 1012. The market return in the period is adjusted by the company's Beta as the basis for the predicted company shareholder return in the period 1114. The predicted shareholder return is then compared to TRS 1116 to compare the company's performance relative to the market. Again, using TRS Mapping methodology, company management will have the analytical tools to support their commentary on this variance.

Similar to conventional financial reporting, it is recommended that companies provide supplemental disclosures and MD&A for each of the EBR statements to enhance overall financial disclosure by providing users with a comprehensive economic perspective of the company. Similar to the use of estimates in accrual accounting, there will also be judgment involved in calculating certain requirements (e.g., WACC), however as long as the methodology or source is adequately disclosed, the EBR users will have rich information available to use as they deem appropriate. The EBR supplemental disclosures would provide the necessary supporting details such that every calculation and key assumption would adequately inform both sophisticated and basic users.

Accordingly, a computer-implemented method for the EBR methodology for preparing corporate financial statements incorporating financial metrics to measure the performance of a company includes receiving financial data about the company; preparing a Statement of Total Economic Profit (TEP) comprising calculating with a data processor EBIT, NOPAT, WACC, EPCV, EPFV and TEP at least at the beginning and ending of a reporting period based on the received financial data; preparing a Statement of Enterprise Value (EV) comprising calculating with a data processor market value of equity, market value of debt, and enterprise value at least at the beginning and ending of a reporting period based on the received financial data; preparing a Statement of Total Return to Shareholders (TRS), comprising calculating with a data processor an unadjusted Total Return to Shareholders comprising a change in market value of equity plus dividends paid in the period based on the received financial data; adjusting the unadjusted TRS comprising deducting the TRS value expected from the movement of the relevant market from the beginning of the reporting period to the ending of the reporting period based on a beta value for the company based on the received financial data and reporting the adjusted TRS in a financial statement; and displaying the Statements with conventional financial reports to the financial services community.

Optionally, the displayed Statement of Total Economic Profit further includes invested capital, capital charge, ROIC, and the spread between ROIC and WACC. Optionally, the displayed Statement of Enterprise Value (EV) further includes EPCV, WACC, EPCV in perpetuity, current value, future value and debt to equity ratio. Optionally, the displayed Statement of Total Return to Shareholders (TRS) further includes EPCV in perpetuity, Capital available to Equity Holders, Current Value in the Market Value of Equity, Future Value in the Market Value in Equity, Number of Outstanding Equity Shares and the Closing Share Price of the Equity in the reporting period.

Preferably, the method further includes displaying with the adjusted TRS the value for beta, a market index indicative of a relevant market value at the beginning and ending of the reporting period, a predicted return based on the market values, and a TRS performance score relative to the market index. Optionally, the method further includes incorporating supporting disclosure in the Statements, the supporting disclosure explaining the methodologies and financial data used to calculate certain of the financial metrics included in the statements.

In one aspect, the method may include determining whether to buy or sell securities of the company based on an evaluation of the financial metrics reported in the Statements. In another aspect, the method includes electronically transmitting the Statements to a management group within the company, and may also include electronically transmitting the Statements to a public financial regulatory organization.

In another embodiment, the invention includes a computer-implemented method for preparing corporate financial statements incorporating financial metrics to measure the performance of a company. This method includes receiving in a computer-readable format conventional financial reports of the company and financial data relating to performance of the company; calculating with a computer a Net Operating Profit After Tax (NOPAT); calculating with a computer a Weighted Average Cost of Capital (WACC); calculating a Return on Invested Capital (ROIC); calculating a value of Invested Capital of the company, including optional adjustments for operating leases, goodwill and stock options; calculating a Market Value of Debt, including optional adjustments for off balance sheet financing; supplementing the data from the conventional financial reports with the calculated results; and reporting electronically, financial statements including the conventional financial reports and the supplemented data, and further including market capitalization data and a valuation of a Beta for equity prices of the company's publicly traded shares.

Preferably, the method includes calculating the financial metrics for at least two reporting periods and reporting a change in the financial metric over the two periods. Preferably, the change in the financial metric is reported in absolute value or as a percentage.

In another embodiment, a computer program product is provided that stores computer instructions therein for performing a method for preparing financial reports to supplement conventional balance sheets and income statements of a company. The program product includes a recording medium readable by the computer that stores instructions on the recording medium instructing the computer to perform the method. The instructions and the method include calculating supplemental financial metrics Net Operating Profit After Tax (NOPAT), Weighted Average Cost of Capital (WACC), a Return on Invested Capital (ROIC), a value of Invested Capital of the company with optional adjustments for operating leases, goodwill and stock options, and a Market Value of Debt with adjustments for off balance sheet financing; retrieving financial metrics from the balance sheets and income statements; applying the supplemental financial metrics and the retrieved financial metrics to calculate a set of enhance business reporting metrics including a total return to shareholder value; and generating supplemental financial reports using the enhanced business metrics.

Based on the teachings described herein, others of ordinary skill in the art will appreciate other applications of the system, apparatus and methods in accordance with this invention. Accordingly, it is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method comprising:
   receiving, into a memory coupled to a processor, financial data about a company;
   preparing, with instructions stored in the memory and executed by the processor, a Statement of Total Economic Profit (TEP) comprising calculating with a data processor Earnings before Interest and Taxes (EBIT), Net Operating Profit After Tax (NOPAT), Weighted Average Cost of Capital (WACC), Economic Profit of Current Value (EPCV), Economic Profit of Future Value (EPFV), Total Economic Profit (TEP) at least at a beginning and ending of a reporting period based on the received financial data,
   preparing, with the instructions, a Statement of Enterprise Value (EV) comprising the EPCV, the WACC, and calculating with a data processor market value of equity, market value of debt, EPCV in perpetuity and enterprise value at least at the beginning and ending of a reporting period based on the received financial data, where the EPCV in perpetuity is calculated by dividing the EPFV by the WACC;
   preparing, with the instructions, a Statement of Total Return to Shareholders (TRS), comprising the EPCV in perpetuity and calculating with a data processor an unadjusted Total Return to Shareholders (unadjusted TRS) comprising a change in market value of equity plus dividends paid in the period based on the received financial data, wherein the Statement of TRS reflects that unadjusted TRS=((EPCV in perpetuity+Invested Capital−Capital subordinate to Debt+Future Value in Market Value of Equity)/The Number of Shares Outstanding)+Dividends per share, wherein the Future Value in Market Value of Equity=Market Value of Equity+Debt−NOPLAT/WACC−Excess Cash;
   adjusting, with the instructions, the unadjusted TRS and calculating an adjusted TRS, the adjusting comprising: determining an expected TRS value based on a predefined industry-based market index from the beginning of the reporting period to the ending of the reporting period based on a beta value for the company and deducting the expected TRS value from the unadjusted TRS value to obtain an adjusted TRS value, wherein the adjusted TRS=the unadjusted TRS−((percent change in the predefined industry-based market index)*(closing Beta)), and
   reporting the adjusted TRS in a financial statement; and
   displaying, in a graphical display coupled to the processor, Statements comprising the Statement of Total Economic Profit (TEP), the Statement of Enterprise Value (EV), and the Statement of Total Return to Shareholders (TRS) with Generally Accepted Accounting Principles (GAAP) financial reports to the financial services community.

2. The computer-implemented method of claim 1, wherein the displayed Statement of total Economic Profit further includes invested capital, capital charge, Return on Invested Capital (ROIC), and the spread between ROIC and WACC.

3. The computer-implemented method of claim 1, wherein the displayed Statement of Enterprise Value (EV) includes the EPCV, the WACC, the EPCV in perpetuity, current value, future value and debt to equity ratio.

4. The computer-implemented method of claim 1, wherein the displayed Statement of total Return to Shareholders (TRS) further includes EPCV in perpetuity, Capital available to Equity Holders, Current Value in the Market Value of Equity, Future Value in the Market Value in Equity, Number of Outstanding Equity Shares and the Closing Share Price of the Equity in the reporting period.

5. The computer-implemented method of claim 1, further comprising displaying with the adjusted TRS the value for beta, the predefined industry-based market index indicative of a market value relevant to the predefined industry at the beginning and ending of the reporting period, a predicted return based on the market values, and a TRS performance score relative to the market index.

6. The computer-implemented method of claim 1 further comprising determining whether to buy or sell securities of the company based on an evaluation of the financial metrics reported in the Statements.

7. The computer-implemented method of claim 1 further comprising incorporating supporting disclosure in the Statements, the supporting disclosure explaining the methodologies and financial data used to calculate certain of the financial metrics included in the statements.

8. A computer program product storing computer instructions therein, the computer program product comprising:
   a recording medium readable by a computer; and
   the computer instructions stored on said recording medium instructing the computer to:
   calculate supplemental financial metrics Net Operating Profit After Tax (NOPAT), Weighted Average Cost of Capital (WACC), a Return on Invested Capital (ROIC), a value of Invested Capital of the company with optional adjustments for operating leases, goodwill and stock options, and a Market Value of Debt with adjustments for off balance sheet financing;
   retrieve financial metrics from the balance sheets and income statements;
   receive financial data;

calculate, by applying the supplemental financial metrics and the retrieved financial metrics, a set of enhanced business reporting metrics including a total return to shareholder (unadjusted TRS) value adjusted for market fluctuation, an Economic Profit of Current Value (EPCV), Economic Profit of Future Value (EPFV), Total Economic Profit (TEP), market value of equity, market value of debt, enterprise value, and a value of EPCV in Perpetuity determined by capitalizing the EPCV over the WACC by dividing the EPFV by the WACC, a change in the market value of equity plus dividends paid based on the received financial data, value of beta, a predicted movement of company share price due to changes in a predefined industry-based market index from the beginning of a reporting period to the ending of the reporting period based on the beta value, wherein the unadjusted TRS=((EPCV in perpetuity+Invested Capital−Capital subordinate to Debt+Future Value in Market Value of Equity)/The Number of Shares Outstanding)+Dividends per share, wherein the Future Value in Market Value of Equity=Market Value of Equity+Debt−NOPLAT/WACC−Excess Cash, and adjusting the TRS value by the predicted movement of company price due to the change in the relevant market index, wherein the adjusted TRS=the unadjusted TRS−((percent change in the predefined industry-based market index)*(closing Beta)); and generate supplemental financial reports using the enhanced business reporting metrics.

9. The computer program product of claim 8, where generating supplemental financial reports includes generating a Total Economic Profit report containing a current period and a prior period value for NOPAT, WACC, Invested Capital, EPCV, EPFV and TEP.

10. The computer program product of claim 8, where generating supplemental financial reports includes generating an Enterprise Value report containing market value of equity, market value of debt, and enterprise value.

11. The computer program product of claim 10, where generating supplemental financial reports includes generating the Enterprise Value report containing the EPCV, the WACC and the value of EPCV in Perpetuity.

12. The computer program product of claim 11, further comprising calculating the TRS value based on the change in equity prices and dividends received, and wherein generating supplemental financial reports includes generating a TRS report containing the change in market value of equity, closing share prices for the beginning and ending of the reporting period and the unadjusted TRS value.

13. The computer program product of claim 12, wherein generating supplemental financial reports includes generating a TRS adjusted report containing the predefined industry-based market index, beta predict company return due to market movement and an adjusted TRS indicative of the shareholder return above or below the expected return due to market movement.

14. A computer system comprising:
a database comprising financial data;
a data processor in communication with the database;
a recording medium storing executable instructions readable by the data processor, the instructions being stored on said recording medium instructing the data processor to:

calculate with the data processor supplemental financial metrics Net Operating Profit After Tax (NOPLAT), Weighted Average Cost of Capital (WACC), a Return on Invested Capital (ROIC), a value of Invested Capital of the company with optional adjustments for operating leases, goodwill and stock options, and a Market Value of Debt with adjustments for off balance sheet financing;

retrieve financial metrics from balance sheets and income statements stored in the database;

calculate a set of enhanced business reporting metrics including a total return to shareholder (TRS) value adjusted for market fluctuation by applying the supplemental financial metrics and the retrieved financial metrics;

generate supplemental financial reports using the enhanced business metrics; and display, in a graphical display in communication with the data processor, the supplemental financial reports;

wherein said generating supplemental financial reports comprises:
(i) preparing, with the instructions, a Statement of Enterprise Value (EV) comprising calculating with a data processor market value of equity, market value of debt, Economic Profit of Current Value (EPCV) in perpetuity, enterprise value, current value (CV) and future value (FV) at least at the beginning and ending of a reporting period based on the retrieved financial metrics, where the EPCV in perpetuity is calculated by dividing the EPFV by the WACC;
(ii) preparing, with the instructions, a Statement of Total Return to Shareholders (TRS), comprising the EPCV in perpetuity and calculating with a data processor an unadjusted Total Return to Shareholders (unadjusted TRS) comprising a change in market value of equity plus dividends paid in the period based on the received financial data, wherein the Statement of TRS reflects that unadjusted TRS=((EPCV in perpetuity+Invested Capital−Capital subordinate to Debt+Future Value in Market Value of Equity)/The Number of Shares Outstanding)+Dividends per share, wherein the Future Value in Market Value of Equity=Market Value of Equity+Debt+NOPLAT/WACC−Excess Cash;
(iii) adjusting, with the instructions, the unadjusted TRS, the adjusting comprising determining an expected TRS value based on a predefined industry-based market index from the beginning of the reporting period to the ending of a reporting period based on a beta value for the company and deducting the expected TRS value from the unadjusted TRS values to obtain an adjusted TRS value, wherein the adjusted TRS=the unadjusted TRS−((percent change in the predefined industry-based market index)*(closing Beta)), and
(iv) preparing an Adjusted TRS Statement reporting the adjusted TRS.

15. The computer system of claim 14, wherein the instructions being stored on said recording medium instructing the data processor to perform the method further including instructions that calculate future value with the data processor, said future value being calculated as the difference between enterprise value and current value, said current value being calculated as NOPLAT divided by WACC minus excess cash.

* * * * *